(12) United States Patent
Ai et al.

(10) Patent No.: US 12,280,996 B2
(45) Date of Patent: Apr. 22, 2025

(54) MATERIAL HANDLING METHOD AND DEVICE, SERVER, AND HANDLING ROBOT

(71) Applicant: HAI ROBOTICS CO., LTD., Shenzhen (CN)

(72) Inventors: Xin Ai, Shenzhen (CN); Yeguang Chen, Shenzhen (CN); Shaokai Zhou, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 946 days.

(21) Appl. No.: 17/381,133

(22) Filed: Jul. 20, 2021

(65) Prior Publication Data

US 2022/0024737 A1 Jan. 27, 2022

(30) Foreign Application Priority Data

Jul. 24, 2020 (CN) ......................... 202010724223.8

(51) Int. Cl.
*B66F 9/06* (2006.01)
*B65G 1/137* (2006.01)
(Continued)

(52) U.S. Cl.
CPC ............ *B66F 9/063* (2013.01); *B65G 1/1373* (2013.01); *B66F 9/0755* (2013.01); *G06Q 10/06316* (2013.01); *G06Q 10/087* (2013.01)

(58) Field of Classification Search
CPC ...... B66F 9/063; B66F 9/0755; B65G 1/1373; B65G 1/04; B65G 1/1375; B65G 1/0492;
(Continued)

(56) References Cited

U.S. PATENT DOCUMENTS

| 2020/0242544 | A1* | 7/2020 | Galluzzo | ................ B25J 9/1692 |
| 2021/0395007 | A1* | 12/2021 | Galluzzo | ............... B65G 1/1371 |
| 2022/0084153 | A1* | 3/2022 | Johnson | ............... G06Q 10/083 |

FOREIGN PATENT DOCUMENTS

| CN | 102887320 A | 1/2013 |
| CN | 105858045 A | 8/2016 |

(Continued)

OTHER PUBLICATIONS

EP21185932 Report—Retrieved from Global Dossier (Year: 2022).*
(Continued)

*Primary Examiner* — Jacob S. Scott
*Assistant Examiner* — Erin Morris
(74) *Attorney, Agent, or Firm* — J.C. PATENTS

(57) ABSTRACT

The present disclosure provides a material handling method and device, a server and a handling robot. The material handling method provided by the present embodiment includes: acquiring position information and idle storage unit information of a robot; and allocating a second handling task to the robot according to the position information, the idle storage unit information and a position of a first target included in a first handling task; where one of the first handling task and the second handling task is a material fetching task, and the other is a returning task. Thus, a handling strategy can be set flexibly, and fetching materials while returning is implemented during a material handling process, the handling efficiency of the materials is improved effectively.

15 Claims, 12 Drawing Sheets

(51) Int. Cl.
*B66F 9/075* (2006.01)
*G06Q 10/0631* (2023.01)
*G06Q 10/087* (2023.01)

(58) Field of Classification Search
CPC .......... G06Q 10/06316; G06Q 10/087; G06Q 10/08; G06Q 10/0832; B25J 9/1664; B25J 9/1679; B25J 9/1694
See application file for complete search history.

(56) References Cited

FOREIGN PATENT DOCUMENTS

| | | | | |
|---|---|---|---|---|
| CN | 106927179 | A | | 7/2017 |
| CN | 107003662 | A | | 8/2017 |
| CN | 107878990 | A | | 4/2018 |
| CN | 108415437 | A | | 8/2018 |
| CN | 109636269 | A | | 4/2019 |
| CN | 110040412 | A | | 7/2019 |
| CN | 110239868 | A | * | 9/2019 ............... B65G 1/04 |
| CN | 110356760 | A | | 10/2019 |
| CN | 110428197 | A | | 11/2019 |
| CN | 110949923 | A | | 4/2020 |
| CN | 111115080 | A | | 5/2020 |
| CN | 111792259 | A | | 5/2020 |
| CN | 111260278 | A | | 6/2020 |
| CN | 111348361 | A | | 6/2020 |
| CN | 111792260 | A | | 10/2020 |
| DE | 102017219668 | A1 | | 5/2019 |
| JP | H03232604 | A | | 10/1991 |
| JP | H0439202 | A | | 2/1992 |
| JP | H07101509 | A | | 4/1995 |
| JP | 2002293404 | A | | 10/2002 |
| JP | 2017141102 | A | | 8/2017 |
| JP | 2018043832 | A | | 3/2018 |
| JP | 6661211 | B1 | | 2/2020 |
| KR | 20150143582 | A | | 12/2015 |
| KR | 20180103996 | A | | 9/2018 |
| KR | 20200058543 | A | | 5/2020 |
| WO | WO2019046114 | A1 | | 3/2019 |
| WO | WO-2021038437 | A1 | * | 3/2021 ........... B65G 1/0464 |

OTHER PUBLICATIONS

International Search Report of PCT/CN2021/104498.
The first Office Action of the priority CN application.
Notice of Allowance of the parallel application KR10-2021-0097224.
First Office Action of the parallel application JP2022-164000.
Notice of Allowance of the parallel application JP2021-119543.

* cited by examiner

MATERIAL HANDLING METHOD AND DEVICE, SERVER, AND HANDLING ROBOT

CROSS-REFERENCE TO RELATED APPLICATION

This application claims priority to Chinese Patent Application No. 202010724223.8, filed on Jul. 24, 2020, which is hereby incorporated by reference in its entirety.

TECHNICAL FIELD

The present disclosure relates to the field of intelligent warehousing technologies, and in particular, to a material handling method and device, a server and a handling robot.

BACKGROUND

With the rise and development of electronic commerce and online shopping, huge development opportunities have been brought for intelligentization of warehousing and logistics of materials, and in recent years, technologies of material handling based on warehousing robots have become increasingly mature.

In the prior art, after a warehousing robot handles a material box to a workstation for an operation, the material box needs to be placed back into a shelf area. For a warehousing robot capable of handling a plurality of material boxes at one time, a strategy of "return before fetching" is generally adopted, that is, material boxes which need to be placed back to the shelf area are first placed back at one time, and then a task of handling a material box to the workstation is executed.

However, the above handling manner is not flexible enough, and has low material handling efficiency.

SUMMARY

The present disclosure provides a material handling method and device, a server and a handling robot, which can set a handling strategy flexibly and improve the material handling efficiency.

According to a first aspect, the present disclosure provides a material handling method, where the method includes:
  acquiring position information and idle storage unit information of a robot; and
  allocating, according to the position information, the idle storage unit information and a position of a first target included in a first handling task, a second handling task to the robot; where one of the first handling task and the second handling task is a material fetching task, and the other is a returning task.

In some possible embodiments, the second handling task is allocated at any time point before, during, or after the first handling task is executed.

In some possible embodiments, a change of the idle storage unit information for the robot to execute the first handling task is estimated, and the second handling task is inserted selectively before, during or after the first handling task.

In some possible embodiments, when the second handling task is the returning task, the allocating the second handling task to the robot includes:
  determining, according to the position information and the position of the first target included in the first handling task, a return position of a second target in the second handling task.

In some possible embodiments, the determining the return position of the second target in the second handling task includes:
  determining the return position as an initial storage position of the second target; or
  determining the return position as a position of an idle storage site; or
  determining the return position as the position of the first target.

In some possible embodiments, when the return position is the position of the idle storage site, the determining, according to the position information and the position of the first target included in the first handling task, the return position of the second target in the second handling task includes:
  generating, according to the position information and the position of the first target included in the first handling task, a material fetching path; and determining positions corresponding to U idle storage sites whose distances from the material fetching path are within a first preset range as return positions of the second target; where U is a natural number greater than 0; and/or
  determining, according to the position information, positions corresponding to U idle storage sites whose distances from the robot are within a second preset range as return positions of the second target; where U is a natural number greater than 0.

In some possible embodiments, when the return position is the position of the idle storage site, the determining, according to the position information and the position of the first target included in the first handling task, the return position of the second target in the second handling task includes:
  generating, according to the position information and the position of the first target included in the first handling task, a material fetching path;
  predicting a first total time consumed when the robot respectively reaches positions corresponding to V idle storage sites to return materials, and fetches the first target according to the material fetching path; where V is a natural number not less than U, and U is a natural number greater than 0;
  recording a difference between the consumed first total time and time consumed when the robot fetches the first target according to the material fetching path as a first increased time consumption; and
  determining U idle storage sites with the first increased time consumption not greater than a first preset threshold among the V idle storage sites as return positions of the second target.

In some possible embodiments, when the return position is the position of the idle storage site, the determining, according to the position information and the position of the first target included in the first handling task, the return position of the second target in the second handling task includes:
  generating, according to the position information and the position of the first target included in the first handling task, a material fetching path;
  predicting a first movement distance increased when the robot respectively reaches positions corresponding to V idle storage sites to return materials, and fetches the first target according to the material fetching path; where V is a natural number not less than U, and U is a natural number greater than 0; and determining U idle storage sites with the increased first movement distance not greater than a second preset threshold among the V idle storage sites as return positions of the second target.

In some possible embodiments, when the second handling task is the material fetching task and a total quantity of idle storage units indicated by the idle storage unit information of the robot is zero, the method further includes:

allocating at least one first handling task before the second handling task is executed.

In some possible embodiments, when the second handling task is the material fetching task and a total quantity of idle storage units indicated by the idle storage unit information of the robot is greater than zero, the allocating the second handling task to the robot includes:

determining, according to the position information, the idle storage unit information, and the position of the first target included in the first handling task, a material fetching position of the second target in the second handling task.

In some possible embodiments, the determining the material fetching position of the second target in the second handling task includes:

determining, according to the position information and the position of the first target included in the first handling task, N material fetching positions of the second target; where N is a natural number greater than 0 and not greater than the total quantity of idle storage units indicated by the idle storage unit information.

In some possible embodiments, the determining, according to the position information and the position of the first target included in the first handling task, the N material fetching positions of the second target includes:

generating, according to the position information and the position of the first target included in the first handling task, a return path; and determining N material fetching positions whose distances from the return path are within a third preset range as material fetching positions of the second target; and/or determining, according to the position information, N material fetching positions whose distances from the robot are within a fourth preset range as material fetching positions of the second target.

In some possible embodiments, the determining, according to the position information and the position of the first target included in the first handling task, the N material fetching positions of the second target includes:

generating, according to the position information and the position of the first target included in the first handling task, a return path;

predicting a second total time consumed when the robot respectively reaches M material fetching positions to fetch materials, and returns the first target according to the return path; where M is a natural number not less than N;

recording a difference between the consumed second total time and time consumed when the robot returns the first target according to the return path as a second increased time consumption; and determining N material fetching positions with the second increased time consumption not greater than a third preset threshold among the M material fetching positions as material fetching positions of the second target.

In some possible embodiments, the determining, according to the position information and the position of the first target included in the first handling task, the N material fetching positions of the second target includes:

generating, according to the position information and the position of the first target included in the first handling task, a return path;

predicting a second movement distance increased when the robot respectively reaches M material fetching positions to fetch materials, and returns the first target according to the return path; where M is a natural number not less than N; and determining N material fetching positions with the increased second movement distance not greater than a fourth preset threshold among the M material fetching positions as material fetching positions of the second target.

In some possible embodiments, before the allocating the second handling task to the robot, the method further includes:

determining whether a planned path corresponding to the second handling task complies with a reservation requirement; where the reservation requirement includes that no robot travels on the planned path within a preset time.

In some possible embodiments, the method further includes:

reallocating the second handling task if the planned path does not comply with the reservation requirement.

In some possible embodiments, the method further includes:

receiving a handling task cancellation request or a new handling task addition request sent by a client terminal; and reallocating the second handling task according to the handling task cancellation request or the new handling task addition request.

In some possible embodiments, when the first handling task and the second handling task are allocated, any one or more of the following constraints are considered:

total movement time for the robot to complete the material fetching task and the returning task;

a total number of times of material fetching operations and return operations performed by the robot when completing the material fetching task and the returning task;

a total travel distance for the robot to complete the material fetching task and the returning task; and a load rate of the robot when completing the material fetching task and the returning task.

In some possible embodiments, when a shelf for placing materials has two or more storage positions in a shelf depth direction, and a position of a target indicated by the material fetching task or the returning task is a second sequential position of storage positions or a position thereafter, the method further includes:

instructing the robot to handle a non-target material which is placed before the position of the target to an idle storage unit of the robot;

instructing the robot to execute the material fetching task or the returning task for the position of the target; and instructing the robot to return the non-target material to an original storage position of the shelf, or return the non-target material to an idle storage position; where the idle storage position and the position of the target belong to the same shelf or different shelves.

In some possible embodiments, the method further includes:

allocating a tally task to the robot, where the tally task includes: performing material sorting on a target, and/or adjusting a storage position of the target; where:

execution timing of the tally task includes any one of the following situations:
before the first handling task and the second handling task;
between the first handling task and the second handling task;
after the first handling task and the second handling task; and
during an execution process of any task in a task sequence constituted by the first handling task and the second handling task.

According to a second aspect, the present disclosure provides a material handling method, where the method includes:
acquiring a handling task sequence to execute a first handling task; and
executing, during an execution process of the first handling task, the second handling task, where one of the first handling task and the second handling task is a material fetching task and the other is a returning task;
where the second handling task is obtained during the execution process of the first handling task, or the acquired handling task sequence includes the second handling task.

In some possible embodiments, the method further includes:
reporting, by a robot, at least one of position information and idle storage unit information to a server periodically or aperiodically; and/or
when a robot receives a request indication from a server, reporting, by the robot, at least one of position information and idle storage unit information to the server.

In some possible embodiments, when the second handling task is the returning task, the executing, during the execution process of the first handling task, the second handling task includes:
acquiring a position of a first target from the first handling task, and acquiring a return position of a second target from the second handling task;
reaching the return position of the second target to execute the returning task, during a process of travelling to the position of the first target; and
travelling to the position of the first target to execute the material fetching task.

In some possible embodiments, the return position of the second target in the second handling task includes:
an initial storage position of the second target; or
a position of an idle storage site; or
a position of the first target.

In some possible embodiments, the acquiring the return position of the second target from the second handling task includes:
acquiring positions corresponding to U idle storage sites from the second handling task; where distances between the positions corresponding to the U idle storage sites and a robot material fetching path are within a first preset range; and/or distances between the positions corresponding to the U idle storage sites and the robot are within a second preset range; where U is a natural number greater than 0; and the material fetching path is generated according to the position information and the position of the first target included in the first handling task.

In some possible embodiments, the acquiring the return position of the second target from the second handling task includes:
acquiring positions corresponding to U idle storage sites from the second handling task; where a first increased time consumption generated when the robot returns materials according to the positions corresponding to the U idle storage sites is not greater than a first preset threshold, and U is a natural number greater than 0; and/or
acquiring positions corresponding to U idle storage sites from the second handling task; where a first movement distance increased when the robot returns materials according to the positions corresponding to the U idle storage sites is not greater than a second preset threshold, and U is a natural number greater than 0.

In some possible embodiments, when the second handling task is the material fetching task, the executing, during the execution process of the first handling task, the second handling task includes:
acquiring a position of a first target from the first handling task, and acquiring a material fetching position of a second target from the second handling task;
reaching the material fetching position of the second target to execute the material fetching task, during a process of travelling to the position of the first target; and
travelling to the position of the first target to execute the returning task.

In some possible embodiments, the acquiring the material fetching position of the second target from the second handling task includes:
acquiring N material fetching positions of the second target from the second handling task; where distances between the N material fetching positions of the second target and a return path are within a third preset range; and the return path is generated according to the position information and the position of the first target included in the first handling task; and/or
acquiring N material fetching positions of the second target from the second handling task; where distances between the N material fetching positions of the second target and the robot are within a fourth preset range; and the return path is generated according to the position information and the position of the first target included in the first handling task.

In some possible embodiments, the acquiring the material fetching position of the second target from the second handling task includes:
acquiring N material fetching positions of the second target from the second handling task; where a second increased time consumption generated when the robot fetches materials according to the N material fetching positions of the second target is not greater than a third preset threshold, and N is a natural number greater than 0; and/or
acquiring N material fetching positions of the second target from the second handling task; where a second movement distance increased when the robot fetches materials according to the N material fetching positions of the second target is not greater than a fourth preset threshold, and N is a natural number greater than 0.

In some possible embodiments, the first handling task and the second handling task are related to any one or more of the following constraints:
total movement time for the robot to complete the material fetching task and the returning task;

a total number of times of material fetching operations and return operations performed by the robot when completing the material fetching task and the returning task;

a total travel distance for the robot to complete the material fetching task and the returning task; and a load rate of the robot when completing the material fetching task and the returning task.

In some possible embodiments, when a shelf for placing materials has two or more storage positions in a shelf depth direction, and a position of a target indicated by the material fetching task or the returning task is a second sequential position of storage positions or a position thereafter, the method further includes:

handling a non-target material which is placed before the position of the target to an idle storage unit of the robot;

executing the material fetching task or the returning task for the position of the target; and returning the non-target material to an original storage position of the shelf, or returning the non-target material to an idle storage position; where the idle storage position and the position of the target belong to the same shelf or different shelves.

In some possible embodiments, the method further includes:

receiving a tally task allocated by a server, where the tally task includes: performing material sorting on a target, and/or adjusting a storage position of the target; and executing the tally task; where execution timing of the tally task includes any one of the following situations:

before the first handling task and the second handling task;

between the first handling task and the second handling task;

after the first handling task and the second handling task; and during an execution process of any task in a task sequence constituted by the first handling task and the second handling task.

According to a third aspect, the present disclosure further provides a material handling device for executing any one of the material handling methods described in the first aspect, where the device includes:

an acquiring module, configured to acquire position information and idle storage unit information of a robot; and a processing module, configured to allocate, according to the position information, the idle storage unit information and a position of a first target included in a first handling task, a second handling task to the robot; where one of the first handling task and the second handling task is a material fetching task, and the other is a returning task.

According to a fourth aspect, the present disclosure provides a material handling device, configured to execute any one of the material handling methods described in the second aspect, where the device includes:

a sending module, configured to acquire a handling task sequence to execute a first handling task; and an executing module, configured to execute, during an execution process of the first handling task, a second handling task, one of the first handling task and the second handling task is a material fetching task and the other is a returning task; where the second handling task is obtained during the execution process of the first handling task, or the acquired handling task sequence includes the second handling task.

According to a fifth aspect, the present disclosure further provides a server, including:

a processor; and a memory, configured to store executable instructions of the processor;

where the processor is configured to execute any one of the material handling methods in the first aspect via executing the executable instructions.

According to a sixth aspect, the present disclosure further provides a handling robot, including: a robot body, where the robot body further includes a memory and a processor, and the memory is configured to store executable instructions of the processor;

where the processor is configured to execute any one of the material handling methods in the second aspect via executing the executable instructions.

In some possible embodiments, the robot body includes a mobile chassis, a robot shelf, a lift device and a material handling device;

the robot shelf is mounted to the mobile chassis; the lift device and the material handling device are mounted to the robot shelf, and the lift device is configured to drive the material handling device to move up and down relative to the robot shelf; and the material handling device includes at least one handling mechanism mounted to the robot shelf, and the handling mechanism is configured to store and fetch a target.

In some possible embodiments, the material handling device includes a sucker handling assembly.

In some possible embodiments, the material handling device includes a machine clamping arm.

In some possible embodiments, when the material handling device includes at least two handling mechanisms, the at least two handling mechanisms are disposed on the robot shelf in parallel.

In some possible embodiments, the at least two handling mechanisms are located on the same layer of the robot shelf, and the at least two handling mechanisms are of an integral structure.

In some possible embodiments, the robot shelf includes three or more upright posts located on the same vertical plane and disposed on the mobile chassis; and each handling mechanism is mounted between two adjacent upright posts and movable up and down relative to the upright posts, where there is no relative movement between the handling mechanisms located on the same layer.

In some possible embodiments, when there are two handling mechanisms, one of the handling mechanisms is configured to handle a target on a warehousing shelf to the robot shelf, and at the same time, the other handling mechanism is configured to transfer a target on the robot shelf to the warehousing shelf.

In some possible embodiments, a handling mechanism includes a temporary storage pallet and a telescopic arm mounted on the temporary storage pallet, the temporary storage pallet is configured to store a target temporarily, and the telescopic arm is configured to push a target on the temporary storage pallet onto the warehousing shelf and the robot shelf, or push a target on the warehousing shelf or the robot shelf onto the temporary storage pallet.

In some possible embodiments, there are two telescopic arms, and the two telescopic arms are disposed in parallel and opposite to each other on the temporary storage pallet.

In some possible embodiments, the telescopic arm includes an outer section arm, an inner section arm and a handling component, the outer section arm is mounted to the temporary storage pallet, the inner section arm is mounted to the outer section arm, the handling component is mounted to the inner arm, and the inner section arm is movable relative to the outer section arm, which enables the handling component to push the target to move.

In some possible embodiments, the handling component is a pusher component, and the pusher component includes a first pusher and a second pusher;

the first pusher is mounted to a front end surface of the inner section arm, and can be rotated to a horizontal or vertical position relative to the front end surface of the inner section arm, which enables the first pusher to push a target on the warehousing shelf onto the temporary storage pallet, or push a target on the temporary storage pallet onto the warehousing shelf; and the second pusher is mounted to a rear end surface of the inner section arm, and can be rotated to a horizontal or vertical position relative to the rear end surface of the inner section arm, which enables the second pusher to push a target on the temporary storage pallet onto the robot shelf, or push a target on the robot shelf onto the temporary storage pallet.

In some possible embodiments, the pusher component further includes a driving member, the driving member is connected to the first pusher and the second pusher, and the driving member is configured to drive the first pusher and the second pusher to rotate relative to an end surface of the inner section arm, which enables the first pusher and the second pusher to rotate to a horizontal or vertical position.

In some possible embodiments, the handling component is a clamping component, and the clamping component is disposed on an inner side the inner section arm; and a clamping operation or a releasing operation on a target is performed by adjusting opposite side forces of the clamping component or the telescopic arm.

In some possible embodiments, the telescopic arm further includes at least one middle section arm, the middle section arm is mounted between the inner section arm and the outer section arm, is connected to the inner section arm and the outer section arm, the middle section arm is movable relative to the outer section arm, and the inner section arm is movable relative to the middle section arm.

In some possible embodiments, the lift device includes two lift components, the two lift components are mounted to opposite two sides of the robot shelf respectively and are opposite to each other, and two ends of the material handling device are connected to the two lift components respectively, and the two lift components drive the material handling device to move up and down relative to the robot shelf.

In some possible embodiments, a lift component includes a driving wheel, a driven wheel and a transmission belt, where the driving wheel is mounted at the bottom of the robot shelf, the driven wheel is mounted at the top of the robot shelf, the transmission belt is sleeved on the driving wheel and the driven wheel, the driving wheel rotates to drive the transmission belt to move, and the transmission belt drives the two handling mechanisms to move up and down relative to the robot shelf.

In some possible embodiments, the robot shelf is provided with at least two storage positions for storing the target.

In some possible embodiments, when the handling robot executes a returning task, the handling robot travels to a return position of a second target; and one of the handling mechanisms in the material handling device moves the second target located on the robot shelf to the return position of the second target through the lift device, and pushes the second target to the return position of the second target.

In some possible embodiments, when the handling robot executes a material fetching task, the handling robot travels to a material fetching position of a first target; and one of the handling mechanisms in the material handling device is moved to the material fetching position of the first target through the lift device, fetches the first target from the warehousing shelf and then places it onto the robot shelf.

In some possible embodiments, after executing the material fetching task for the first target, one of the handling mechanisms in the material handling device moves the second target located on the robot shelf to the material fetching position of the first target through the lift device, and pushes the second target to the material fetching position of the first target.

In some possible embodiments, the material handling device includes: at least two handling mechanisms are mounted to the robot shelf, and each handling mechanism is disposed in different layers along a lift direction, and each handling mechanism is configured to store and fetch a target respectively.

In some possible embodiments, there are two handling mechanisms, where one handling mechanism is configured to handle a target on a warehousing shelf onto the robot shelf, and at the same time, the other handling mechanism is configured to transfer a target on the robot shelf onto the warehousing shelf.

In some possible embodiments, a handling mechanism includes a temporary storage pallet and a telescopic arm mounted to the temporary storage pallet, the temporary storage pallet is configured to store the target temporarily, and the telescopic arm is configured to push a target on the temporary storage pallet onto the warehousing shelf and the robot shelf, or push a target on the warehousing shelf or the robot shelf onto the temporary storage pallet.

In some possible embodiments, there are two telescopic arms, and the two telescopic arms are disposed in parallel and opposite to each other on the temporary storage pallet.

In some possible embodiments, the telescopic arm includes an outer section arm, an inner section arm and a pusher component, the outer section arm is mounted to the temporary storage pallet, the inner section arm is mounted to the outer section arm, the pusher component is mounted to the inner section arm, and the inner section arm is movable relative to the outer section arm, which enables the pusher component to push the target to move.

In some possible embodiments, the pusher component includes a first pusher and a second pusher;

the first pusher is mounted to a front end surface of the inner section arm, and can be rotated to a horizontal or vertical position relative to the front end surface of the inner section arm, which enables the first pusher to push the target on the warehousing shelf onto the temporary storage pallet, or push the target on the temporary storage pallet onto the warehousing shelf; and the second pusher is mounted to a rear end surface of the inner section arm, and can be rotated to a horizontal or vertical position relative to the rear end surface of the inner section arm, which enables the second pusher to push the target on the temporary storage pallet onto the robot shelf, or push the target on the robot shelf onto the temporary storage pallet.

In some possible embodiments, the pusher component further includes a driving member, the driving member is connected to the first pusher and the second pusher, and the driving member is configured to drive the first pusher and the second pusher to rotate relative to an end surface of the inner section arm, which enables the first pusher and the second pusher to rotate to a horizontal or vertical position.

In some possible embodiments, the telescopic arm further includes at least one middle section arm, the middle section arm is mounted between the inner section arm and the outer section arm, and is connected to the inner section arm and the outer section arm, the middle section arm is movable relative to the outer section arm, and the inner section arm is movable relative to the middle section arm.

In some possible embodiments, at least two handling mechanisms are fixedly connected as a whole through a connecting plate.

In some possible embodiments, the lift device includes two lift components, the two lift components are mounted to opposite two sides of the robot shelf respectively and are opposite to each other, and two ends of each handling mechanism are connected to the two lift components respectively, and the two lift components drive each handling mechanism to move up and down relative to the robot shelf.

In some possible embodiments, a lift component includes a driving wheel, a driven wheel and a transmission belt, where the driving wheel is mounted at the bottom of the robot shelf, the driven wheel is mounted at the top of the robot shelf, the transmission belt is sleeved on the driving wheel and the driven wheel, the driving wheel rotates to drive the transmission belt to move, and the transmission belt drives the two handling mechanisms to move up and down relative to the robot shelf.

In some possible embodiments, the robot shelf is provided with at least two storage positions for storing the target.

In some possible embodiments, the handling robot further includes a support beam, and the support beam is mounted to the robot shelf and movable up and down relative to the robot shelf; and
  each handling mechanism is mounted to the support beam.

In some possible embodiments, the handling robot further includes an installation bracket and a slewing component mounted to the installation bracket, where each handling mechanism is mounted to the slewing component, the installation bracket is mounted to the support beam, and the slewing component is configured to drive each handling mechanism to rotate in a plane perpendicular to a lift direction of the support beam.

In some possible embodiments, the installation bracket includes two installation plates disposed opposite to each other and a load-bearing beam connected to the two installation plates, and the two installation plates are connected to the support beam; and
  the slewing component includes a load-bearing plate mounted to the load-bearing beam, a rotation plate disposed apart from the load-bearing plate, and an cross bearing configured to connect the load-bearing plate and the rotation plate, a first sprocket is connected to the cross bearing, and a second sprocket and a motor for driving the second sprocket to rotate are provided on the rotation plate, and the first sprocket and the second sprocket are connected through a chain. When the motor drives the second sprocket to rotate, the second sprocket drives the first sprocket to rotate through the chain, and when the first sprocket rotates, each handling mechanism located on the rotation plate is driven to rotate along an axis of the first sprocket.

In some possible embodiments, when the handling robot executes a returning task, the handling robot travels to a return position of a second target;
  where one of the handling mechanisms moves the second target located on the robot shelf to the return position of the second target through the lift device, and pushes the second target to the return position of the second target.

In some possible embodiments, when the handling robot executes a material fetching task, the handling robot travels to a material fetching position of a first target;
  where one of the handling mechanisms is moved to the material fetching position of the first target through the lift device, fetches the first target from the warehousing shelf and then places it onto the robot shelf.

In some possible embodiments, after executing the material fetching task for the first target, one of the handling mechanisms moves the second target located on the robot shelf to the material fetching position of the first target through the lift device, and pushes the second target to the material fetching position of the first target.

According to a seventh aspect, the present disclosure further provides a warehousing system, including: a handling robot, a server, a shelf, and a workstation, where the handling robot is communicatively connected to the server;
  the server is configured to execute any one of the material handling methods according to the first aspect; and
  the handling robot is configured to execute any one of the material handling methods according to the second aspect, so as to implement material handling between the shelf and the workstation.

According to an eighth aspect, an embodiment of the present disclosure further provides a storage medium having a computer program stored therein, where the program is executed by a processor to implement any one of the material handling methods according to the first aspect.

According to a ninth aspect, an embodiment of the present disclosure further provides a storage medium having a computer program stored therein, where the program is executed by a processor to implement any one of the material handling methods according to the second aspect.

According to a tenth aspect, the present disclosure further provides a robot, including: a mobile chassis, a robot shelf, a lift device, and a material handling device,
  the robot shelf is mounted to the mobile chassis;
  the mobile chassis is configured to be movable to a position of a first target included in a first handling task, and a position of a second target included in a second handling task; where one of the first handling task and the second handling task is a material fetching task, and the other is a returning task;
  the lift device and the material handling device are mounted to the robot shelf, and the lift device is configured to drive the material handling device to move up and down relative to the robot shelf; and
  the material handling device is configured to handle the first target between the robot shelf and the position of the first target, and handle the second target between the robot shelf and the position of the second target;
  where the robot executes the second handling task during an execution process of the first handling task.

In some possible embodiments, when the second handling task is the returning task, the mobile chassis reaches the return position during a process of the mobile chassis travelling to the position of the first target; and the material handling device cooperates with the lift device to handle the second target from the robot shelf to the return position.

In some possible embodiments, the return position is any one of an initial storage position of the second target, a position of an idle storage site and a position of the first target, where when the return position is the position of the first target, the material handling device handles the first target to the robot shelf, and then handles the second target to the position of the first target.

In some possible embodiments, the material handling device includes at least one handling mechanism mounted to the robot shelf, and the handling mechanism is configured to store and fetch a target.

In some possible embodiments, the material handling device includes a sucker handling assembly and/or a machine clamping arm.

In some possible embodiments, the material handling device includes at least two handling mechanisms, and the at least two handling mechanisms are disposed in parallel or disposed in different layers along a lift direction.

In some possible embodiments, when the at least two handling mechanisms are disposed in parallel, the at least two handling mechanisms are located on the robot shelf, and the at least two handling mechanisms are of an integral structure.

In some possible embodiments, when the at least two handling mechanisms are disposed in parallel, the robot shelf includes three or more upright posts located on the same vertical plane and disposed on the mobile chassis; and each handling mechanism is mounted between two adjacent upright posts and movable up and down relative to the upright posts, where the handling mechanisms are configured to allow relative movement or not allow relative movement.

In some possible embodiments, when the at least two handling mechanisms are disposed in parallel, the lift device includes two lift components, the two lift components are mounted to opposite two sides of the robot shelf respectively, and two ends of the material handling device are connected to the two lift components respectively, and the two lift components drive the material handling device to move up and down relative to the robot shelf.

In some possible embodiments, when the at least two handling mechanisms are disposed in different layers along the lift direction, the handling mechanisms are configured to allow relative movement or not allow relative movement.

In some possible embodiments, when the at least two handling mechanisms are disposed in different layers along the lift direction, the at least two handling mechanisms are located on the robot shelf, and the at least two handling mechanisms are of an integral structure.

In some possible embodiments, when the at least two handling mechanisms are disposed in different layers along the lift direction, the lift device includes two lift components, the two lift components are mounted to opposite two sides of the robot shelf respectively, and two ends of each handling mechanism are connected to the two lift components respectively, and the two lift components drive each handling mechanism to move up and down relative to the robot shelf.

In some possible embodiments, when there are two handling mechanisms, one of the handling mechanisms is configured to handle a target on a warehousing shelf onto the robot shelf, and the other handling mechanism is configured to transfer a target on the robot shelf onto the warehousing shelf.

In some possible embodiments, when the handling robot executes a material fetching task, the handling robot travels to a material fetching position of a first target; and one of the handling mechanisms in the material handling device is moved to the material fetching position of the first target through the lift device, fetches the first target from the warehousing shelf and then places it onto the robot shelf.

In some possible embodiments, after executing the material fetching task for the first target, one of the handling mechanisms in the material handling device moves the second target located on the robot shelf to the material fetching position of the first target through the lift device, and pushes the second target to the material fetching position of the first target.

In some possible embodiments, when the handling robot executes a returning task, the handling robot travels to a return position of a second target; and
  one of the handling mechanisms in the material handling device moves the second target located on the robot shelf to the return position of the second target through the lift device, and pushes the second target to the return position of the second target.

In some possible embodiments, the robot shelf is provided with at least two storage positions for storing the target.

In some possible embodiments, the handling mechanism includes a temporary storage pallet and two telescopic arms disposed on the temporary storage pallet in parallel and opposite to each other, an inner section arm of each telescopic arm includes a handling component, and the handling component includes a pusher component and/or a clamping component.

According to an eleventh aspect, the present disclosure provides a material handling method, applied to any one of the robots according to the tenth aspect, where the method includes:
  acquiring a handling task sequence to execute a first handling task; and
  executing, during an execution process of the first handling task, a second handling task, where one of the first handling task and the second handling task is a material fetching task and the other is a returning task;
  where the second handling task is obtained during the execution process of the first handling task, or the acquired handling task sequence includes the second handling task.

In some possible embodiments, the robot reports at least one of position information and idle storage unit information to a server periodically or aperiodically.

In some possible embodiments, when receiving a request from a server, the robot reports at least one of position information and idle storage unit information to the server.

In some possible embodiments, when the second handling task is the returning task, the executing, during the execution process of the first handling task, the second handling task includes:
  acquiring a position of a first target from the first handling task, and acquiring a return position of a second target from the second handling task;
  reaching the return position of the second target to execute the returning task, during a process of travelling to the position of the first target; and
  travelling to the position of the first target to execute the material fetching task.

In some possible embodiments, the return position of the second target in the second handling task includes:
  an initial storage position of the second target; or
  a position of an idle storage site; or
  the position of the first target.

In some possible embodiments, the acquiring the return position of the second target from the second handling task includes:

acquiring positions corresponding to U idle storage sites from the second handling task; where distances between the positions corresponding to the U idle storage sites and a robot material fetching path are within a first preset range; and/or distances between the positions corresponding to the U idle storage sites and the robot are within a second preset range; where U is a natural number greater than 0; and the material fetching path is generated according to the position information and the position of the first target included in the first handling task.

In some possible embodiments, the acquiring the return position of the second target from the second handling task includes:

acquiring positions corresponding to U idle storage sites from the second handling task; where a first increased time consumption generated when the robot returns materials according to the positions corresponding to the U idle storage sites is not greater than a first preset threshold, and/or a first movement distance increased when the robot returns materials according to the positions corresponding to the U idle storage sites is not greater than a second preset threshold, and U is a natural number greater than 0.

In some possible embodiments, when the second handling task is the material fetching task, the executing, during the execution process of the first handling task, the second handling task includes:

acquiring a position of a first target from the first handling task, and acquiring a material fetching position of a second target from the second handling task;

reaching the material fetching position of the second target to execute the material fetching task, during a process of travelling to the position of the first target; and travelling to the position of the first target to execute the returning task.

In some possible embodiments, the acquiring the material fetching position of the second target from the second handling task includes:

acquiring N material fetching positions of the second target from the second handling task; where distances between the N material fetching positions of the second target and a return path are within a third preset range, and/or distances between the N material fetching positions of the second target and the robot are within a fourth preset range; N is a natural number greater than 0; and the return path is generated according to the position information and the position of the first target included in the first handling task.

In some possible embodiments, the acquiring the material fetching position of the second target from the second handling task includes:

acquiring N material fetching positions of the second target from the second handling task; where a second increased time consumption generated when the robot fetches materials according to the N material fetching positions of the second target is not greater than a third preset threshold, and/or a second movement distance increased when the robot fetches materials according to the N material fetching positions of the second target is not greater than a fourth preset threshold, and N is a natural number greater than 0.

In some possible embodiments, the first handling task and the second handling task are related to any one or more of the following movement constraints:

total movement time for the robot to complete the material fetching task and the returning task;

a total number of times of material fetching operations and return operations performed by the robot when completing the material fetching task and the returning task;

a total travel distance for the robot to complete the material fetching task and the returning task; and a load rate of the robot when completing the material fetching task and the returning task.

In some possible embodiments, when a shelf for placing materials has two or more storage positions in a shelf depth direction, and a position of a target indicated by the material fetching task or the returning task is a second sequential position of storage positions or a position thereafter, the method further includes:

handling a non-target material which is placed before the position of the target to an idle storage unit of the robot;

executing the material fetching task or the returning task for the position of the target; and returning the non-target material to an original storage position of the shelf, or returning the non-target material to an idle storage position; where the idle storage position and the position of the target belong to the same shelf or different shelves.

In some possible embodiments, the method further includes:

receiving a tally task allocated by a server, where the tally task includes: performing material sorting on a target, and/or adjusting a storage position of the target; and executing the tally task; where execution timing of the tally task includes any one of the following situations:

before the first handling task and the second handling task;

between the first handling task and the second handling task;

after the first handling task and the second handling task; and during an execution process of any task in a task sequence constituted by the first handling task and the second handling task.

According to a twelfth aspect, the present disclosure further provides a server, including:

a processor; and a memory, configured to store executable instructions of the processor;

where the processor is configured to allocate the first handling task and the second handling task to any one of the robots according to the tenth aspect via executing the executable instructions.

According to a thirteenth aspect, the present disclosure further provides a warehousing system, including: the robot according to any one item of the tenth aspect, the server according to the twelfth aspect, a shelf, and a workstation, where the robot is communicatively connected to the server;

the server allocates the first handling task and the second handling task to the robot; and the robot executes the material handling method according to any one item of the eleventh aspect, so as to implement material handling between the shelf and the workstation.

According to a fourteenth aspect, an embodiment of the present disclosure further provides a storage medium having a computer program stored therein, where the program is executed by a processor to implement any one of the material handling methods according to the eleventh aspect.

The present disclosure provides a material handling method and device, a server and a handling robot, where the position information and the idle storage unit information of the robot are acquired; the second handling task is allocated to the robot according to the position information, the idle storage unit information and the position of the first target included in the first handling task; where one of the first handling task and the second handling task is the material fetching task, and the other is the returning task. As such, a handling strategy can be set flexibly, which enables the handling robot to fetch the materials while returning the materials, thereby improving the reasonability of path planning, reducing the overall working time and movement distance of the handling robot, not only saving energy consumption, but also improving the handling efficiency of the materials effectively.

BRIEF DESCRIPTION OF DRAWINGS

In order to describe technical solutions in embodiments of the present disclosure more clearly, accompanying drawings required for describing the embodiments are introduced briefly below, and obviously, the accompanying drawings in the following description are some embodiments of the present disclosure, and for a person of ordinary skill in the art, other drawings may be obtained according to these accompanying drawings without creative efforts.

DESCRIPTION OF REFERENCE SIGNS IN FIG. 10 TO FIG. 15

Figure 1:
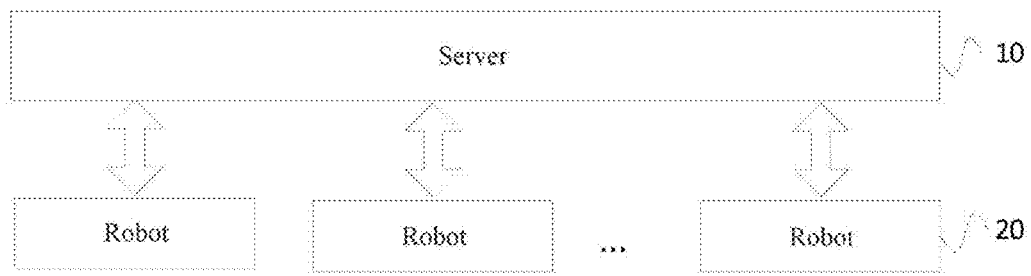
FIG. 1 is an application scenario diagram of a material handling method according to an embodiment of the present disclosure.

1—mobile chassis; 2—robot shelf; 21—storage position; 3—lift component; 31—driving wheel; 32—driven wheel; 33—transmission belt; 4—handling mechanism; 41—temporary storage pallet; 42—telescopic arm; 421—inner section arm; 422—middle section arm; 423—outer section arm; 43—pusher component; 431—first pusher; 432—second pusher.

DESCRIPTION OF EMBODIMENTS

In order to make the objectives, technical solutions and advantages of embodiments of the present disclosure clearer, the technical solutions in the embodiments of the present disclosure will be described clearly and completely below with reference to accompanying drawings in the embodiments of the present disclosure. Apparently, the described embodiments are part of the embodiments of the present disclosure rather than all embodiments. Based on the embodiments of the present disclosure, all other embodiments obtained by a person skilled in the art without creative efforts belong to the protection scope of the present disclosure.

The terms "first", "second", "third", "fourth" and the like (if any) in the description and claims of the present disclosure and the foregoing accompanying drawings are used for differentiating similar objects, rather than being used for describing a specific order or sequence. It should be understood that, data used in such a manner may be interchanged where appropriate, so that the embodiments of the present disclosure described here may be implemented in an order other than those illustrated or described here. Moreover, the terms "including", "having" and any variation thereof, are intended to cover non-exclusive inclusion, for example, a process, a method, a system, a product or equipment that includes a series of steps or units is not necessarily limited to those steps or units listed clearly, but may include other steps or units that are not listed clearly or are inherent to the process, method, product or equipment.

With the rise and development of electronic commerce and online shopping, huge development opportunities have been brought for intelligentization of warehousing and logistics of materials, and in recent years, technologies of material handling based on warehousing robots have become increasingly mature. In the prior art, after a warehousing robot handles a material box to a workstation for an operation, the material box needs to be placed back into a shelf area. For a warehousing robot capable of handling a plurality of material boxes at one time, a strategy of "return before fetching" is generally adopted, that is, the material boxes which need to be placed back to the shelf area are first placed back at one time, and then a task of handling a material box to the workstation is executed. However, the above handling manner is not flexible enough, and has low material handling efficiency.

In view of the above technical problem, a material handling method and a warehousing system provided by the present disclosure can set a handling strategy flexibly, and improve the material handling efficiency.

FIG. 1 is an application scenario diagram of a material handling method according to an embodiment of the present disclosure. As shown in FIG. 1, a server 10 and a robot 20 are included, and the robot 20 is communicatively connected to the server 10. The robot 20 may receive an instruction delivered by the server 10, and perform material handling between a shelf and a workstation. The robot 20 may perform a material fetching task while executing a returning task. A return position corresponding to at least one returning task of the handling robot 20 includes any one of the following positions: an initial storage position of a material to be returned; a position corresponding to an idle storage site; a storage position corresponding to a material to be fetched. The server 10 in the present embodiment may generate an initial planned path based on a current position of the robot 20, the return position corresponding to at least one returning task of the robot 20 and a return order. Then, it is determined whether a material fetching task can be inserted into returning tasks of the robot 20, and if a preset condition is satisfied, at least one target is determined from materials to be fetched, and a target planned path is generated. The robot 20 may receive the target planned path sent by the server 10, travel according to the planned path, and execute the material fetching task and the returning task.

It should be noted that, in the present embodiment, the server may be communicatively connected to a plurality of robots, acquire positions and task lists of the plurality of robots at the same time, generate corresponding target planned paths, and send the target planned paths to corresponding robots.

Figure 2:
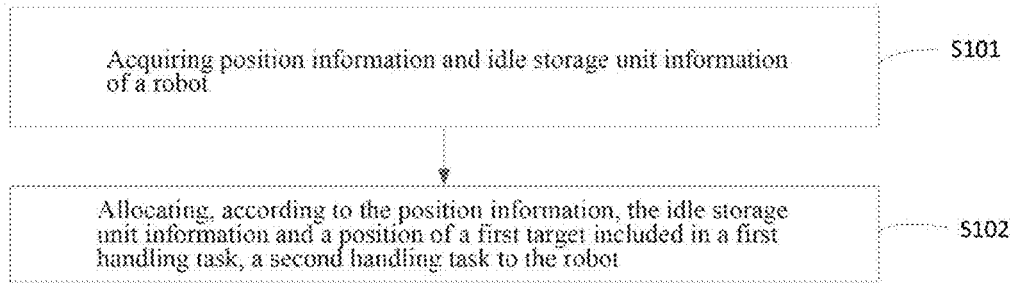
FIG. 2 is a schematic flowchart of a material handling method according to a first embodiment of the present disclosure.

FIG. 2 is a schematic flowchart of a material handling method according to a first embodiment of the present disclosure. As shown in FIG. 2, the material handling method provided in the present embodiment may include:

step 101: acquiring position information and idle storage unit information of a robot.

In the present embodiment, a server may be communicatively connected to a plurality of robots via wireless signals. The server is configured to allocate a first handling task to the robots; and after receiving the first handling task, the robots report their own real-time position information and idle storage unit information to the server. In the present embodiment, the first handling task is not limited, and the first handling task may be a material fetching task or a returning task.

It should be noted that, the present embodiment does not limit the timing of allocating a second handling task. The server may allocate the second handling task to the robot at any time point before, during, and after the first handling task is executed.

In a first case, the server first allocates first handling tasks and second handling tasks to the robot according to the position information and the idle storage unit information of the robot. At this time, a task sequence is generated first, and the task sequence includes interspersed first handling tasks and second handling tasks. After receiving the task sequence, the robot executes the first handling tasks and the second handling tasks in sequence according to the task sequence.

In a second case, the server dynamically allocates the second handling tasks to the robot, that is, when the robot executes the first handling task, one second handling task is interspersed before the first handling task. The robot executes the second handling task on the way of executing the first handling task.

In a third case, the server dynamically allocates the second handling task to the robot, and after executing the first handling task, the robot executes the second handling task.

Step 102: allocating, according to the position information, the idle storage unit information and a position of a first target included in a first handling task, a second handling task to the robot.

In the present embodiment, after the server receives the position information and the idle storage unit information reported by the robot, a planned path of the first handling task is generated according to the position information, the idle storage unit information and the position of the first target included in the first handling task. Then, based on a material fetching request or a material returning request sent by a client, the second handling task is allocated to the robot. It should be noted that, one of the first handling task and the second handling task is a material fetching task, the other is a returning task. That is to say, the robot can implement fetching materials while returning, during a material handling process, which improves the handling efficiency of the materials effectively.

Exemplarily, when the second handling task is the returning task, the server determines, according to the position information and the position of the first target included in the first handling task, a return position of a second target in the second handling task. The return position of the second target may be any one of an initial storage position of the second target, a position of an idle storage site and a position of a first target.

In a first optional embodiment, when the return position is the position of the idle storage site, the server first generates, according to the position information and the position of the first target included in the first handling task, a material fetching path; and determines positions corresponding to U idle storage sites whose distances from the material fetching path are within a first preset range as return positions of the second target; where U is a natural number greater than 0.

In a second optional embodiment, when the return position is the position of the idle storage site, the server determines positions corresponding to U idle storage sites whose distances from the robot are within a second preset range as return positions of the second target; where U is a natural number greater than 0.

In the present embodiment, an idle storage site that meets requirements is selected by a distance between the idle storage site and the material fetching path, and a position corresponding to an idle storage site whose distance from the material fetching path is within a preset range is taken as a return position of the second target. Thus, an idle storage site with a relatively short distance may be selected for the robot to return materials, which reduces a distance that the robot travels when executing the second handling task.

In a third optional embodiment, when the return position is the position of the idle storage site, the server first generates, according to the position information and the position of the first target included in the first handling task, a material fetching path. A first total time consumed when the robot respectively reaches positions corresponding to V idle storage sites to return materials, and fetches the first target according to the material fetching path is predicted; where V is a natural number not less than U, and U is a natural number greater than 0. Then a difference between the consumed first total time and time consumed when the robot fetches the first target according to the material fetching path is recorded as a first increased time consumption; and U idle storage sites with the first increased time consumption not greater than a first preset threshold among the V idle storage sites are determined as return positions of the second target.

In the present embodiment, the returning task is executed by the robot reaching each idle storage site, and the idle storage site is selected by the increased time consumption when executing the material fetching task according to the material fetching path. A position corresponding to an idle storage site with the increased time consumption not greater than the first preset threshold is taken as a return position of the second target. Thus, an idle storage site with relatively short time consumption may be selected for the robot to return materials, which reduces the consumed time for the robot to execute the second handling task.

In a fourth optional embodiment, when the return position is the position of the idle storage site, the server first generates, according to the position information and the position of the first target included in the first handling task, a material fetching path; predicts a first movement distance increased when the robot respectively reaches positions corresponding to V idle storage sites to return materials, and fetches the first target according to the material fetching path, where V is a natural number not less than U, and U is a natural number greater than 0; and determines U idle storage sites with the increased first movement distance not greater than a second preset threshold among the V idle storage sites as return positions of the second target.

In the present embodiment, the returning task is executed by the robot reaching each idle storage site, and the idle storage site is selected by the increased first movement distance when executing the material fetching task according to the material fetching path. A position corresponding to an idle storage site with the increased first movement distance not greater than the second preset threshold is taken as a return position of the second target. Thus, an idle storage site with a relatively short travel distance is selected for the robot to return the materials, which reduces the distance that the robot travels when executing the second handling task.

It should be noted that, the present embodiment does not limit the quantity of returning tasks, and the robot may execute a plurality of returning tasks simultaneously. When the returning tasks are executed, there may be a plurality of strategic arrangements for return positions. One is returning to an original position, each material corresponds to a fixed storage position, and this mode can facilitate warehouse management. Therefore, when a returning task is executed, a return position is an initial storage position of a material to be returned. The other is storing in an empty position, and the material to be returned can be placed in any idle storage site, and this mode has greater flexibility. Therefore, when the returning task is executed, the return position is a position corresponding to an idle storage site. This mode also has a special example, that is, the material fetching task and the returning task may be combined, that is, a storage site of a material to be returned and a storage site of a material to be fetched are exchanged, and at this time, the return position is a storage position corresponding to the material to be fetched.

Exemplarily, when the second handling task is the material fetching task and a total quantity of idle storage units indicated by the idle storage unit information of the robot is zero, the server needs to allocate at least one first handling task before the second handling task is executed. For example, if a current robot is in a fully loaded state currently, and the tasks allocated by the server to the robot include the first handling task and the second handling task, then before the second handling task is executed, the robot needs to execute at least one first handling task so as to obtain an idle storage unit for placing the second target fetched by the second handling task.

When the second handling task is the material fetching task and a total quantity of idle storage units indicated by the idle storage unit information of the robot is greater than zero, the server determines, according to the position information, the idle storage unit information, and the position of the first target included in the first handling task, a material fetching position of the second target in the second handling task.

Exemplarily, the server determines, according to the position information and the position of the first target included in the first handling task, N material fetching positions of the second target; where N is a natural number greater than 0 and not greater than the total quantity of idle storage units indicated by the idle storage unit information.

In a first optional implementation, the server generates a return path according to the position information and the position of the first target included in the first handling task; and determines N material fetching positions whose distances from the return path are within a third preset range as material fetching positions of the second target.

In the present embodiment, a material fetching position that meets requirements is selected by a distance between the material fetching position of the material to be fetched and the return path, and a material fetching position with a distance from the return path within the third preset range is taken as a material fetching position of the second target. Thus, a material fetching task with a relatively short distance is undertaken for the robot, which reduces the distance that the robot travels when executing the second handling task.

In a second optional implementation, the server determines N material fetching positions whose distances from the robot are within a fourth preset range as material fetching positions of the second target.

In a third optional implementation, the server first generates a return path according to the position information and the position of the first target included in the first handling task; predicts a second total time consumed when the robot respectively reaches M material fetching positions to fetch materials, and returns the first target according to the return path, where M is a natural number not less than N; then, records a difference between the consumed second total time and time consumed when the robot returns the first target according to the return path as a second increased time consumption; and determines N material fetching positions with the second increased time consumption not greater than a third preset threshold among the M material fetching positions as material fetching positions of the second target.

Exemplarily, when a shelf for placing materials has two or more storage positions in a shelf depth direction, and a position of a target indicated by the material fetching task or the returning task is a second sequential position of storage positions, or a position thereafter, the server instructs the robot to handle a non-target material which is placed before the position of the target to an idle storage unit of the robot; then instructs the robot to execute the material fetching task or the returning task for the position of the target; and finally instructs the robot to return the non-target material to an original storage position of the shelf, or return the non-target material to an idle storage position; where the idle storage position and the position of the target belong to the same shelf or different shelves.

The technical solution in the above embodiment is applicable to a case where the shelf has a plurality of storage positions in the depth direction thereof, that is, a case where a plurality of targets can be placed in the same position indicated in horizontal and vertical directions of the shelf. In the above embodiment, the server may position the storage positions in the depth position of the shelf, that is, when the robot executes the material fetching task and/or the returning task, the position of the target determined in three directions (a horizontal direction, a vertical direction, and a depth direction) may be obtained accurately, and then the material fetching task and/or the returning task is executed for the position of the target.

Exemplarily, the server may also allocate a tally task to the robot, where the tally task includes: performing material sorting on a target, and/or adjusting a storage position of the target.

In the above embodiment, the server may also allocate the tally task to the robot, where the tally task is configured to implement material sorting on the target, and/or adjustment of the storage position of the target. For example, the quantity and positions of targets are counted. It should be noted that, the present embodiment does not limit the specific execution timing of the tally task. The execution timing of the tally task includes any one of the following situations:

before the first handling task and the second handling task;
between the first handling task and the second handling task;
after the first handling task and the second handling task; and
during an execution process of any task in a task sequence constituted by the first handling task and the second handling task.

In the present embodiment, the material fetching task is executed by the robot reaching each idle storage site, and the material fetching position is selected by the time consumption increased when executing the returning task according to the return path. A material fetching position with the increased time consumption within the preset range is taken as a material fetching position of the second target. Thus, a material fetching task with relatively short time consumption is undertaken for the robot, which reduces the time consumed when the robot executes the second handling task.

In a fourth optional implementation, the server generates a return path according to the position information and the position of the first target included in the first handling task; predicts a second movement distance increased when the robot respectively reaches M material fetching positions to fetch materials, and returns the first target according to the return path, where M is a natural number not less than N; and determines N material fetching positions with the increased second movement distance not greater than a fourth preset threshold among the M material fetching positions, as material fetching positions of the second target.

In the present embodiment, the material fetching task is executed by the robot reaching each material fetching position, and the material fetching position is selected by the second movement distance increased when executing the returning task according to the return path. A material fetching position with the increased second movement distance not greater than the second preset threshold is taken as a material fetching position of the second target. Thus, a material fetching position with a relatively short travel distance is selected for the robot, which reduces the distance that the robot travels when executing the second handling task.

Specifically, when the first handling task is the material fetching task and the second handling task is the returning task, the material fetching path may be generated according to a current position of the robot and a material fetching position executed by the robot currently. Then, one or more returning tasks are inserted during the execution process of the material fetching task, so as to implement an operation of returning while fetching. In a specific operation, all idle storage sites whose distances from the material fetching path are within a preset range may be acquired, and then an idle storage site which has a smallest time consumption and is the most convenient is determined as the return position corresponding to the material to be returned. In this mode, a special case is that the material fetching position becomes an idle storage site after the material fetching task is executed. Therefore, if the robot has an idle storage unit on its body at the time of fetching the material, the robot may directly perform a material fetching operation, and after the material is fetched, a material that needs to be returned on the robot's body is returned to an idle storage site that is vacated just after completion of the material fetching task, that is, storage sites of the two materials are exchanged. In this case, the robot does not need to perform extra movement, and the second increased time consumption is minimal. When there is no idle storage site on the robot, the robot may first search for one idle storage site to return one material, and in this case, there is an idle storage unit on the robot, and then a storage site exchange between the material to be fetched and the material to be returned is performed according to the above embodiment.

Exemplarily, when the server generates the first handling task and the second handling task, any one or more of the following constraints may further be considered: total movement time for the robot to complete the material fetching task and the returning task; a total number of times of material fetching operations and return operations performed by the robot when completing the material fetching task and the returning task; a total travel distance for the robot to complete the material fetching task and the returning task; and a load rate of the robot when completing the material fetching task and the returning task.

Specifically, when a planned path corresponding to the first handling task and the second handling task is generated, an optimal path may be generated according to the movement time, the total number of times of material fetching operations and return operations, the travel distance, the load rate, and the like. Since the materials are stored in a three-dimensional warehouse, not only a planar position but also a height (a position of a material) are considered. When a path is planned, it is necessary to take into account both the time of path travel and the time of lifting of the handling assembly, and height of the handling assembly can be adjusted at the same time during the robot is travelling, so that the total time for the robot to reach a target shelf position and the handling assembly to reach a specified position is the shortest. If a more optimized path is found (for example, the distance is shorter or the time consumption is less), the current path is updated, to generate a new planned path.

In the present embodiment, the position information and the idle storage unit information of the robot are acquired in the process of the robot executing the first handling task; and the second handling task is allocated to the robot according to the position information, the idle storage unit information and the position of the first target included in the first handling task; where one of the first handling task and the second handling task is the material fetching task, and the other is the returning task. As such, a handling strategy can be set flexibly, fetching materials while returning is implemented during the material handling process, and the handling efficiency of the materials is improved effectively.

Figure 3:
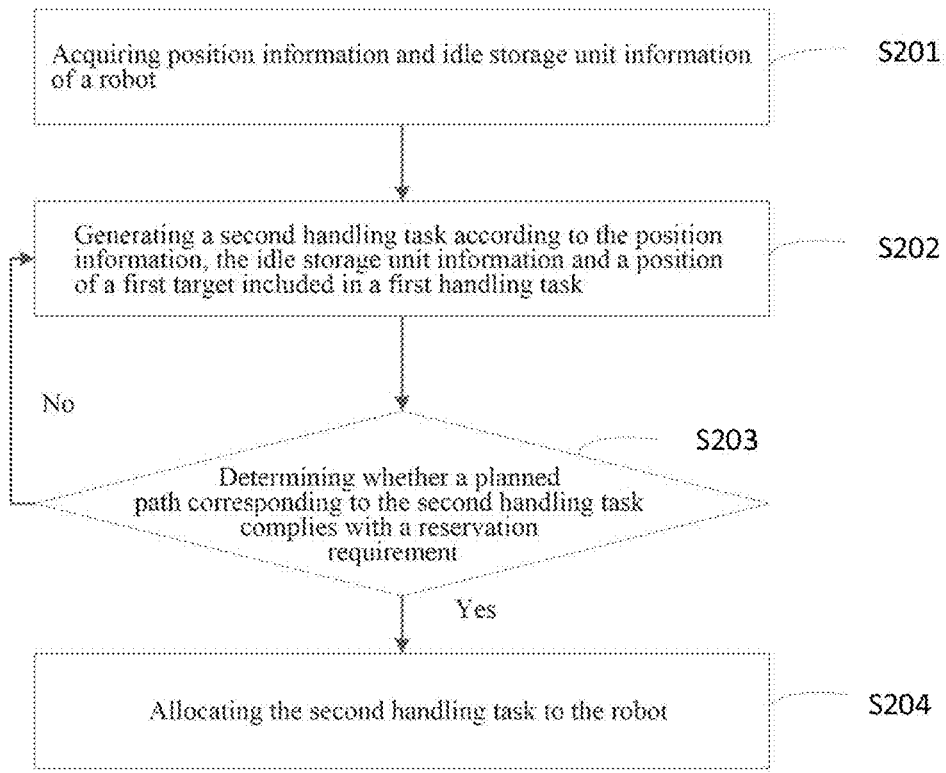
FIG. 3 is a schematic flowchart of a material handling method according to a second embodiment of the present disclosure.

FIG. 3 is a schematic flowchart of a material handling method according to a second embodiment of the present disclosure. As shown in FIG. 3, the material handling method provided in the present embodiment may include:

step 201: acquiring position information and idle storage unit information of a robot.

Step 202: generating a second handling task according to the position information, the idle storage unit information and a position of a first target included in a first handling task.

Step 203: determining whether a planned path corresponding to the second handling task complies with a reservation requirement; if yes, executing step 204; and if no, going back to step 202.

Step 204: allocating the second handling task to the robot.

In the present embodiment, for specific implementation processes and implementation principles of step 201 to step 202, reference may be made to the relevant descriptions of step 101 to step 102 shown in FIG. 2, details are not described herein again.

In step 203, after the server generates the second handling task, it needs to further determine whether the planned path corresponding to the second handling task complies with the reservation requirement; where the reservation requirement includes that no robot travels on the planned path within a preset period of time.

The above reservation mechanism can prevent the robot from collision during a travel process. Only when a reservation succeeds, travelling on a corresponding path is allowed, while other robots are not allowed to travel on a reserved path.

In the present embodiment, before delivering the second handling task, it is determined whether the planned path corresponding to the second handling task complies with the reservation requirement, and only when the planned path complies with the reservation requirement, the server is allowed to allocate the second handling task to the robot. Thus, the robot can be prevented from collision during the travel process, and the safety of the robot can be ensured.

Figure 4:
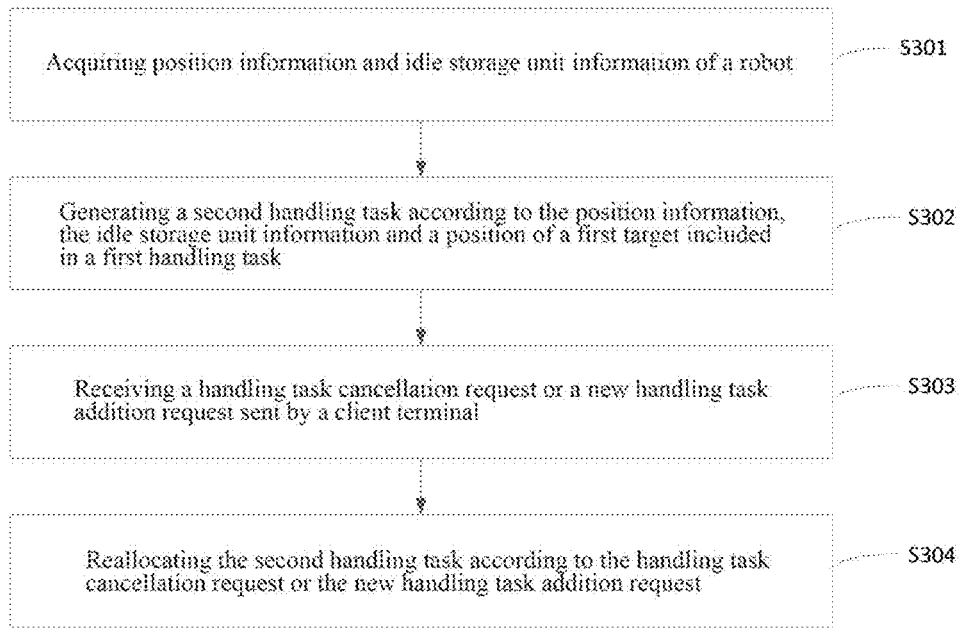
FIG. 4 is a schematic flowchart of a material handling method according to a third embodiment of the present disclosure.

FIG. 4 is a schematic flowchart of a material handling method according to a third embodiment of the present disclosure. As shown in FIG. 4, the material handling method provided in the present embodiment may include:

step 301: acquiring position information and idle storage unit information of a robot.

Step 302: generating a second handling task according to the position information, the idle storage unit information and a position of a first target included in a first handling task.

In the present embodiment, for specific implementation processes and implementation principles of step 301 to step 302, reference may be made to the relevant descriptions of step 101 to step 102 shown in FIG. 2, and details are not described herein again.

Step 303: receiving a handling task cancellation request or a new handling task addition request sent by a client terminal.

Step 304: reallocating the second handling task according to the handling task cancellation request or the new handling task addition request.

In the present embodiment, the server may also receive a task change request sent by the client terminal, and then reallocate the second handling task. The task change request includes the handling task cancellation request and the new handling task addition request, where the handling task cancellation request is used for deleting a returning task and/or a material fetching task, and the new handling task addition request is used for adding a returning task and/or a material fetching task.

Exemplarily, when receiving the handling task cancellation request sent by the client terminal, the server may delete a returning task and/or a material fetching task according to the handling task cancellation request; then, generate a planned path corresponding to the second handling task according to a path optimization parameter, a current position of the robot, a return position corresponding to a remaining returning task, and a storage position corresponding to a remaining target; and deliver the planned path corresponding to the second handling task to the robot.

Exemplarily, when receiving the new handling task addition request sent by the client terminal, the server adds a returning task and/or a material fetching task according to the new handling task addition request; then generates a planned path corresponding to the second handling task according to a path optimization parameter, a current position of the robot, a return position corresponding to the newly added returning task, and a storage position corresponding to the newly added target; and delivers the planned path corresponding to the second handling task to the robot.

In the present embodiment, the task change request sent by the client terminal is received, and then the second handling task is regenerated, and thus, the handling task can be adjusted dynamically and the material handling efficiency is improved.

Figure 5:
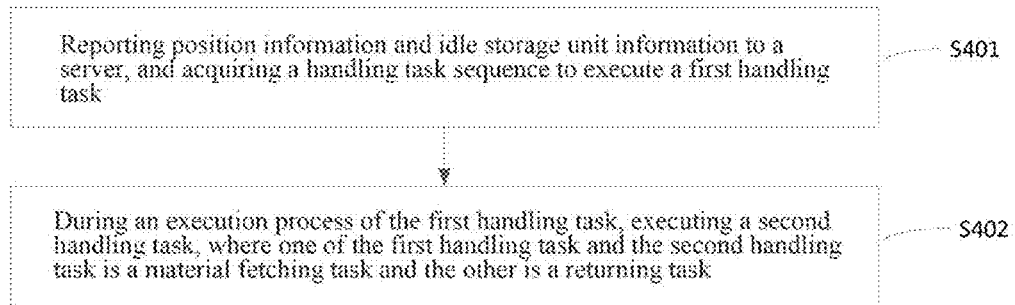
FIG. 5 is a schematic flowchart of a material handling method according to a fourth embodiment of the present disclosure.

FIG. 5 is a schematic flowchart of a material handling method according to a fourth embodiment of the present disclosure. As shown in FIG. 5, the material handling method provided in the present embodiment may include:

step 401: reporting position information and idle storage unit information to a server, and acquiring a handling task sequence to execute a first handling task.

In the present embodiment, the server may be communicatively connected to a plurality of robots via wireless signals. The server is configured to allocate a first handling task to the robots; and after receiving the first handling task, the robots report their own real-time position information and idle storage unit information to the server. In the present embodiment, the first handling task is not limited, and the first handling task may be a material fetching task or a returning task.

In the present embodiment, the server may allocate a second handling task to a plurality of different robots simultaneously. The robots receive the second handling task through their own communication device.

Step 402: during an execution process of the first handling task, executing the second handling task, where one of the first handling task and the second handling task is a material fetching task and the other is a returning task.

In step 402, the second handling task is obtained during the execution process of the first handling task, or the acquired handling task sequence includes the second handling task. Exemplarily, it can be divided into two cases. A first case is that the first handling task is the material fetching task, and the second handling task is the returning task. A second case is that the first handling task is the returning task, and the second handling task is the material fetching task. The first case and the second case will be described in detail below.

Exemplarily, when the second handling task is the returning task, the robot first acquires a position of a first target from the first handling task, and acquires a return position of a second target from the second handling task; then reaches the return position of the second target to executes the returning task, during a process of travelling to the position of the first target; and finally, travels to the position of the first target to execute the material fetching task. The return position of the second target in the second handling task may be any one of an initial storage position of the second target, a position of an idle storage site, and the position of the first target.

In a first optional implementation, the robot acquires positions corresponding to U idle storage sites from the second handling task; where distances between the positions corresponding to the U idle storage sites and a robot material fetching path are within a first preset range, and U is a natural number greater than 0; and the material fetching path is generated according to the position information and the position of the first target included in the first handling task.

In the present embodiment, an idle storage site that meets requirements is selected by distances between the idle storage sites and the material fetching path, and a position corresponding to an idle storage site whose distance from the material fetching path is within a preset range is taken as a return position of the second target. Thus, an idle storage site with a relatively short distance is selected for the robot to return a material, which reduces the distance that the robot travels when executing the second handling task.

In a second optional embodiment, the robot acquires positions corresponding to U idle storage sites from the second handling task; where distances between the positions corresponding to the U idle storage sites and the robot are within a second preset range, and U is a natural number greater than 0; and the material fetching path is generated according to the position information and the position of the first target included in the first handling task.

In a third optional implementation, the robot acquires positions corresponding to U idle storage sites from the second handling task; where a first increased time consumption generated when the robot returns materials according to the positions corresponding to the U idle storage sites is not greater than a first preset threshold, and U is a natural number greater than 0.

In the present embodiment, the returning task is executed by the robot reaching each idle storage site, and the idle storage site is selected by the time consumption increased when executing the material fetching task according to the material fetching path. A position corresponding to an idle storage site with the increased time consumption within the preset range is taken as a return position of the second target. Thus, an idle storage site with relatively short time consumption is selected for the robot to return a material, which reduces the time consumed by the robot when executing the second handling task.

In a fourth optional implementation, the robot acquires positions corresponding to U idle storage sites from the second handling task; where a first movement distance increased when the robot returns materials according to the positions corresponding to the U idle storage sites is not greater than a second preset threshold, and U is a natural number greater than 0.

It should be noted that, the present embodiment does not limit the quantity of returning task, and the robot may execute a plurality of returning tasks simultaneously. When the returning tasks are executed, there may be a plurality of strategic arrangements for return positions. One is returning to an original position, and each material corresponds to a fixed storage position, and this mode can facilitate warehouse management. Therefore, when a returning task is executed, a return position is an initial storage position of a material to be returned. The other is storing in an empty position, and the material to be returned can be placed in any idle storage site, and this mode has greater flexibility. Therefore, when the returning task is executed, the return position is a position corresponding to an idle storage site. This mode also has a special example, that is, the material fetching task and the returning task may be combined, that is, a storage site of the material to be returned and a storage site of a material to be fetched are exchanged, and at this time, the return position is a storage position corresponding to the material to be fetched.

Exemplarily, when the second handling task is the material fetching task, the robot first acquires a position of a first target from the first handling task, and acquires a material fetching position of a second target from the second handling task; then reaches the material fetching position of the second target to execute the material fetching task, during a process of travelling to the position of the first target; and finally, travels to the position of the first target to execute the returning task.

In a first optional implementation, the robot acquires N material fetching positions of the second target from the second handling task; where distances between the N material fetching positions of the second target and a return path are within a third preset range; and the return path is generated according to the position information and the position of the first target included in the first handling task.

In the present embodiment, a material fetching position that meets requirements is selected by a distance between a material fetching position of a material to be fetched and the return path, and a material fetching position whose distance from the return path is within a preset range is taken as the material fetching position of the second target. Thus, a material fetching task with a relatively short distance may be undertaken for the robot, which reduces the distance that the robot travels when executing the second handling task.

In a second optional implementation, the robot acquires N material fetching positions of the second target from the second handling task; where distances between the N material fetching positions of the second target and the robot are within a fourth preset range; and the return path is generated according to the position information and the position of the first target included in the first handling task.

In a third optional implementation, the robot acquires N material fetching positions of the second target from the second handling task; where a second increased time consumption generated when the robot fetches materials according to the N material fetching positions of the second target is not greater than a second preset threshold, and N is a natural number greater than 0.

In the present embodiment, the material fetching task is executed by the robot reaching each material fetching position, and the material fetching position is selected by the time consumption increased when executing the returning task according to the return path. A material fetching position with the increased time consumption within the preset range is taken as a material fetching position of the second target. Thus, a material fetching task with relatively short time consumption is undertaken for the robot, which reduces the time that the robot consumes when executing the second handling task.

In a fourth optional implementation, the robot acquires N material fetching positions of the second target from the second handling task; where a second movement distance increased when the robot fetches materials according to the N material fetching positions of the second target is not greater than a fourth preset threshold, and N is a natural number greater than 0.

Specifically, when the first handling task is the material fetching task and the second handling task is the returning task, the server generates the material fetching path according to the current position of the robot and the material fetching position executed by the robot currently. Then, one or more returning tasks are inserted during the execution process of the material fetching task, so as to implement an operation of returning while fetching. In a specific operation, all idle storage sites whose distances from the material fetching path are within a preset range may be acquired, and then an idle storage site which has a smallest time consumption and is the most convenient is determined as the return position corresponding to the material to be returned. In this mode, a special case is that a material fetching position becomes an idle storage site after a material fetching task is executed. Therefore, if the robot has an idle storage unit on its body at the time of fetching the material, the robot may directly perform a material fetching operation, and after the material is fetched, a material that needs to be returned on the robot's body is returned to an idle storage site that is vacated just after completion of the material fetching task, that is, storage sites of the two materials are exchanged. In this case, the robot does not need to perform extra movement, and the second increased time consumption is minimal. When there is no idle storage site on the robot, the robot may first search for one idle storage site to return one material, and in this case, there is an idle storage site on the robot, and then a storage site exchange between the material to be fetched and the material to be returned is performed according to the above embodiment.

Exemplarily, the first handling task and the second handling task executed by the robot are further related to any one or more of the following constraints: total movement time for the robot to complete the material fetching task and the returning task; a total number of times of material fetching operations and return operations performed by the robot when completing the material fetching task and the returning task; a total travel distance for the robot to complete the material fetching task and the returning task; and a load rate of the robot when completing the material fetching task and the returning task.

Specifically, when the server generates a planned path corresponding to the first handling task and the second handling task, an optimal path may be generated according to the movement time, the total number of times of material fetching operations and return operations, the travel distance, the load rate, and the like. Since the materials are stored in a three-dimensional warehouse, not only a planar position but also a height (a position of a material) are considered. When a path is planned, it is necessary to take into account both the time of path travelling and the time of lifting of the handling assembly, and height of the handling assembly can be adjusted at the same time during the robot is travelling, so that and the overall time for the robot to reach a target shelf position and the handling assembly to reach a specified position is the shortest. If a more optimized path is found (for example, the distance is shorter or the time consumption is less), the current path is updated, to generate a new planned path.

Exemplarily, when a shelf for placing materials has two or more storage positions in a shelf depth direction, and a position of a target indicated by the material fetching task or the returning task is a second sequential position of storage positions, or a position thereafter, the robot handles a non-target material which is placed before the position of the target to an idle storage unit of the robot; then executes the material fetching task or the returning task for the position of the target; and finally returns the non-target material to an original storage position of the shelf, or returns the non-target material to an idle storage position; where the idle storage position and the position of the target belong to the same shelf or different shelves.

The technical solution in the above embodiment is applicable to a case where the shelf has a plurality of storage positions in the depth direction thereof, that is, a case where a plurality of targets can be placed in the same position indicated in horizontal and vertical directions of the shelf. In the above embodiment, the server or the robot may position the storage positions in the depth position of the shelf, that is, when the robot executes the material fetching task and/or the returning task, the position of the target determined in three directions (a horizontal direction, a vertical direction, and a depth direction) may be obtained accurately, and then the material fetching task and/or the returning task is executed for the position of the target.

Exemplarily, the server may also allocate a tally task to the robot, where the tally task includes: performing material sorting out a target, and/or adjusting a storage position of the target.

In the above embodiment, the server may also allocate the tally task to the robot, where the tally task is configured to implement material sorting on the target, and/or adjustment of the storage position of the target. For example, the quantity and positions of targets are counted. It should be noted that, the present embodiment does not limit a specific execution timing of the tally task. The execution timing of the tally task includes any one of the following situations:
- before the first handling task and the second handling task;
- between the first handling task and the second handling task;
- after the first handling task and the second handling task; and
- during an execution process of any task in a task sequence constituted by the first handling task and the second handling task.

In the present embodiment, the position information and the idle storage unit information are reported to the server during the execution process of the first handling task; the second handling task allocated by the server is received; where one of the first handling task and the second handling task is the material fetching task, and the other is the returning task; and the second handling task is executed during the execution process of the first handling task. As such, a handling strategy can be set flexibly, fetching materials while returning is implemented during the material handling process, and the handling efficiency of the materials is improved effectively.

Figure 6:
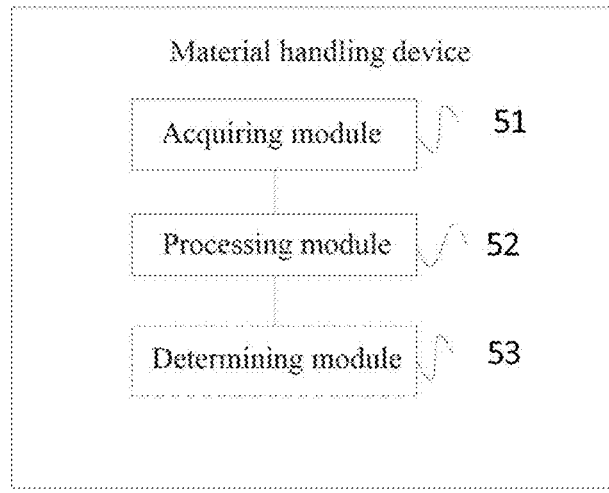
FIG. 6 is a structural schematic diagram of a material handling device according to a fifth embodiment of the present disclosure.

FIG. 6 is a structural schematic diagram of a material handling device according to a fifth embodiment of the present disclosure. As shown in FIG. 6, the material handling device provided in the present embodiment may include:
- an acquiring module 51, configured to acquire position information and idle storage unit information of a robot; and
- a processing module 52, configured to allocate, according to the position information, the idle storage unit information and a position of a first target included in a first handling task, a second handling task to the robot; where one of the first handling task and the second handling task is a material fetching task, and the other is a returning task.

In some possible embodiments, when the second handling task is the returning task, the processing module 52 is specifically configured to:
    determine, according to the position information and the position of the first target included in the first handling task, a return position of a second target in the second handling task.

In some possible embodiments, the processing module 52 is specifically configured to:
    determine the return position as an initial storage position of the second target; or
    determine the return position as a position of an idle storage site; or
    determine the return position as a position of a first target.

In some possible embodiments, the processing module 52 is specifically configured to:
    generate, according to the position information and the position of the first target included in the first handling task, a material fetching path; and
    determine positions corresponding to U idle storage sites whose distances from the material fetching path are within a first preset range as return positions of the second target; where U is a natural number greater than 0.

In some possible embodiments, the processing module 52 is specifically configured to:
    determine positions corresponding to U idle storage sites whose distances from the robot are within a second preset range as return positions of the second target; where U is a natural number greater than 0.

In some possible embodiments, the processing module 52 is specifically configured to:
    generate, according to the position information and the position of the first target included in the first handling task, a material fetching path;
    predict a first total time consumed by the robot when respectively reaching positions corresponding to V idle storage sites to return materials, and fetching the first target according to the material fetching path; where V is a natural number not less than U, and U is a natural number greater than 0;
    record a difference between the consumed first total time and time consumed when the robot fetches the first target according to the material fetching path as a first increased time consumption; and
    determine U idle storage sites with the first increased time consumption not greater than a first preset threshold among the V idle storage sites as return positions of the second target.

In some possible embodiments, the processing module 52 is specifically configured to:
    generate, according to the position information and the position of the first target included in the first handling task, a material fetching path;
    predict a first movement distance increased when the robot respectively reaches positions corresponding to V idle storage sites to return materials, and fetches the first target according to the material fetching path; where V is a natural number not less than U, and U is a natural number greater than 0; and
    determine U idle storage sites with the increased first movement distance not greater than a second preset threshold among the V idle storage sites as return positions of the second target.

In some possible embodiments, when the second handling task is the material fetching task and a total quantity of idle storage units indicated by the idle storage unit information of the robot is zero, the processing module 52 is specifically configured to: allocate at least one first handling task before the second handling task is executed.

In some possible embodiments, the processing module 52 is specifically configured to: when the second handling task is the material fetching task and a total quantity of idle storage units indicated by the idle storage unit information of the robot is greater than zero, determine, according to the position information, the idle storage unit information, and the position of the first target included in the first handling task, a material fetching position of the second target in the second handling task.

In some possible embodiments, determining the material fetching position of the second target in the second handling task includes:
    determining, according to the position information and the position of the first target included in the first handling task, N material fetching positions of the second target; where N is a natural number greater than 0 and not greater than the total quantity of idle storage units indicated by the idle storage unit information.

In some possible embodiments, the processing module 52 is specifically configured to:
    generate a return path according to the position information and the position of the first target included in the first handling task; and
    determine N material fetching positions whose distances from the return path are within a third preset range as material fetching positions of the second object.

In some possible embodiments, the processing module 52 is specifically configured to:
    determine N material fetching positions whose distances from the robot are within a fourth preset range as material fetching positions of the second target.

In some possible embodiments, the processing module 52 is specifically configured to:
    generate a return path according to the position information and the position of the first target included in the first handling task;
    predict a second total time consumed when the robot respectively reaches M material fetching positions to fetch materials, and returns the first target according to the return path; where M is a natural number not less than N;
    record a difference between the consumed second total time and time consumed when the robot returns the first target according to the return path as a second increased time consumption; and
    determine N material fetching positions with the second increased time consumption not greater than a third preset threshold among the M material fetching positions as material fetching positions of the second target.

In some possible embodiments, the processing module 52 is specifically configured to:
    generate a return path according to the position information and the position of the first target included in the first handling task;
    predict a second movement distance increased when the robot respectively reaches M material fetching positions to fetch materials, and returns the first target according to the return path; where M is a natural number not less than N; and
    determine N material fetching positions with the increased second movement distance not greater than a fourth preset threshold among the M material fetching positions as material fetching positions of the second target.

In some possible embodiments, the material handling device further includes: a determining module 53 which is configured to:

determine whether a planned path corresponding to the second handling task complies with a reservation requirement; where the reservation requirement includes that no robot travels on the planned path within a preset period of time.

In some possible embodiments, the processing module 52 is further configured to:

reallocate the second handling task if the planned path does not comply with the reservation requirement.

In some possible embodiments, the processing module 52 is further configured to:

receive a handling task cancellation request or new handling task addition request sent by a client terminal; and reallocate the second handling task according to the handling task cancellation request or the new handling task addition request.

In some possible embodiments, when the first handling task and the second handling task are allocated, any one or more of the following constraints are considered:

total movement time for the robot to complete the material fetching task and the returning task;

a total number of times of material fetching operations and return operations performed by the robot when completing the material fetching task and the returning task;

a total travel distance for the robot to complete the material fetching task and the returning task; and a load rate of the robot when completing the material fetching task and the returning task.

The material handling device provided in the present embodiment may be configured to execute the technical solutions of the method embodiments shown in FIG. 2, FIG. 3 and FIG. 4, and the implementation principles and technical effects thereof are similar to those of the method embodiments, and thus are not described herein again.

In the present embodiment, the position information and the idle storage unit information of the robot are acquired; and the second handling task is allocated to the robot according to the position information, the idle storage unit information and the position of the first target included in the first handling task; where one of the first handling task and the second handling task is the material fetching task, and the other is the returning task. Thus, a handling strategy can be set flexibly, which enables the handling robot to fetch the materials while returning the materials, thereby improving the reasonability of path planning, reducing the overall working time and movement distance of the handling robot, not only saving energy consumption, but also improving the material handling efficiency effectively.

Figure 7:
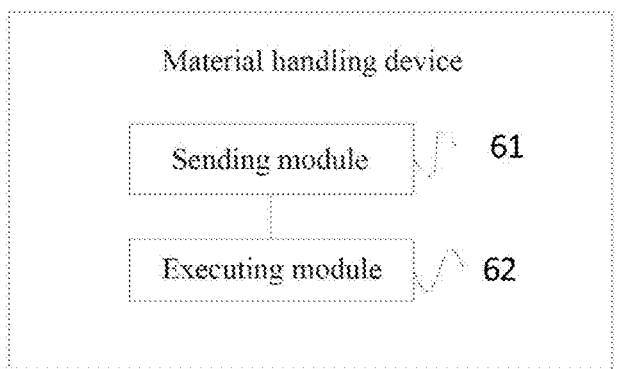
FIG. 7 is a structural schematic diagram of a material handling device according to a sixth embodiment of the present disclosure.

FIG. 7 is a structural schematic diagram of a material handling device according to a sixth embodiment of the present disclosure. As shown in FIG. 7, the material handling device provided in the present embodiment may include:

a sending module 61, configured to report position information and idle storage unit information to a server, and acquire a handling task sequence to execute a first handling task; and an executing module 62, configured to execute the second handling task during an execution process of the first handling task, where one of the first handling task and the second handling task is a material fetching task and the other is a returning task; where the second handling task is obtained during execution of the first handling task, or the acquired handling task sequence includes the second handling task.

In some possible embodiments, when the second handling task is the returning task, the executing module 62 is specifically configured to:

acquire a position of a first target from the first handling task, and acquire a return position of a second target from the second handling task;

reach the return position of the second target to execute the returning task, during a process of travelling to the position of the first target; and travel to the position of the first target to execute the material fetching task.

In some possible embodiments, the return position of the second target in the second handling task includes:

an initial storage position of the second target; or a position of an idle storage site; or a position of the first target.

In some possible embodiments, the executing module 62 is specifically configured to:

acquire positions corresponding to U idle storage sites from the second handling task; where distances between the positions corresponding to the U idle storage sites and a robot material fetching path are within a first preset range, U is a natural number greater than 0; and the material fetching path is generated according to the position information and the position of the first target included in the first handling task.

In some possible embodiments, the executing module 62 is specifically configured to:

acquire positions corresponding to U idle storage sites from the second handling task; where distances between the positions corresponding to the U idle storage sites and the robot are within a second preset range, U is a natural number greater than 0; and the material fetching path is generated according to the position information and the position of the first target included in the first handling task.

In some possible embodiments, the executing module 62 is specifically configured to:

acquire positions corresponding to the U idle storage sites from the second handling task; where a first increased time consumption generated when the robot returns materials according to the positions corresponding to the U idle storage sites is not greater than a first preset threshold, and U is a natural number greater than 0.

In some possible embodiments, the executing module 62 is specifically configured to:

acquire positions corresponding to the U idle storage sites from the second handling task; where a first movement distance increased when the robot returns materials according to the positions corresponding to the U idle storage sites is not greater than a second preset threshold, and U is a natural number greater than 0.

In some possible embodiments, the executing module 62 is specifically configured to:

acquire a position of a first target from the first handling task, and acquire a material fetching position of a second target from the second handling task;

reach the material fetching position of the second target to execute the material fetching task during a process of travelling to the position of the first target; and travel to the position of the first target to execute the returning task.

In some possible embodiments, the executing module 62 is specifically configured to:

acquire N material fetching positions of the second target from the second handling task; where distances between the N material fetching positions of the second target and a return path are within a preset range; and the return path is generated according to the position information and the position of the first target included in the first handling task.

In some possible embodiments, the executing module 62 is specifically configured to:

acquire N material fetching positions of the second target from the second handling task; where a second increased time consumption generated when the robot fetches materials according to the N material fetching positions of the second target is not greater than a third preset threshold, and N is a natural number greater than 0.

In some possible embodiments, the executing module 62 is specifically configured to:

acquire N material fetching positions of the second target from the second handling task; where distances between the N material fetching positions of the second target and the robot are within a fourth preset range; and the return path is generated according to the position information and the position of the first target included in the first handling task.

In some possible embodiments, the first handling task and the second handling task are related to any one or more of the following constraints: total movement time for the robot to complete the material fetching task and the returning task;

a total number of times of material fetching operations and return operations performed by the robot when completing the material fetching task and the returning task;

a total travel distance for the robot to complete the material fetching task and the returning task; and a load rate of the robot when completing the material fetching task and the returning task.

The material handling device provided in the present embodiment may be configured to execute the technical solution of the method embodiment shown in FIG. 5, and has similar the implementation principles and technical effects to the method embodiment, and thus are not described herein again.

In the present embodiment, the position information and the idle storage unit information are reported to the server during the execution process of the first handling task; the second handling task allocated by the server is received; one of the first handling task and the second handling task is the material fetching task, and the other is the returning task; and the second handling task is executed during the execution process of the first handling task. Thus, a handling strategy can be set flexibly, which enables the handling robot to fetch the materials while returning the materials, thereby improving the reasonability of path planning, reducing the overall working time and movement distance of the handling robot, not only saving energy consumption, but also improving the material handling efficiency effectively.

Figure 8:
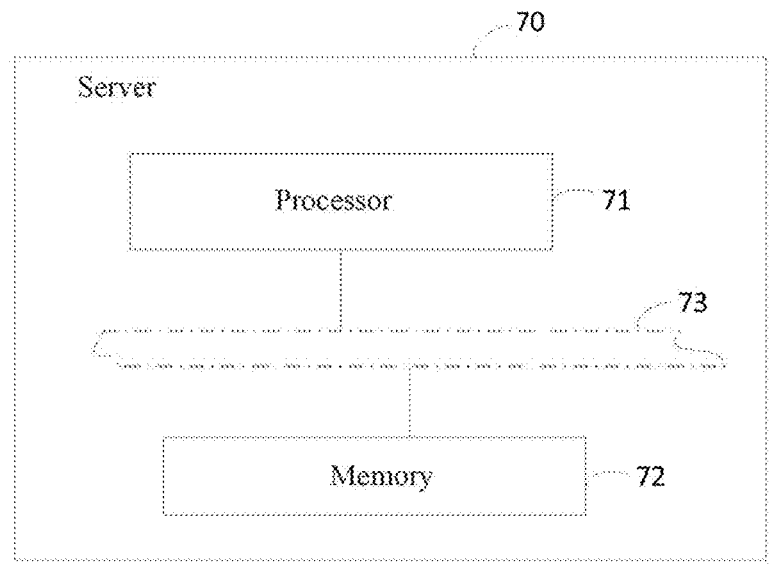
FIG. 8 is a structural schematic diagram of a server according to a seventh embodiment of the present disclosure.

FIG. 8 is a structural schematic diagram of a server according to a seventh embodiment of the present disclosure. As shown in FIG. 8, the present embodiment provides a server 70, including:

a processor 71; and a memory 72, configured to store executable instructions of the processor, where the memory may be a flash memory;

where the processor 71 is configured to execute each step of the above method via executing the executable instructions. For details, reference may be made to the relevant description in the foregoing method embodiments.

Optionally, the memory 72 may be independent or integrated with the processor 71.

When the memory 72 is a device independent of the processor 71, the server 70 may further include:

a bus 73, configured to connect the processor 71 and the memory 72.

The server provided in the present embodiment may be configured to execute the technical solutions of the method embodiments shown in FIG. 2, FIG. 3 and FIG. 4, and the implementation principles and technical effects thereof are similar to those of the method embodiments, and thus are not described herein again.

In the present embodiment, the position information and the idle storage unit information of the robot are acquired during a process of the robot executing the first handling task; and the second handling task is allocated to the robot according to the position information, the idle storage unit information and the position of the first target included in the first handling task; where one of the first handling task and the second handling task is the material fetching task, and the other is the returning task. Thus, a handling strategy can be set flexibly, which enables the handling robot to fetch the materials while returning the materials, thereby improving the reasonability of path planning, reducing the overall working time and movement distance of the handling robot, not only saving energy consumption, but also improving the material handling efficiency effectively.

The present embodiment further provides a handling robot, including: a robot body and several storage units disposed on the robot body for placing materials, where the robot body further includes a memory and a processor, and the memory is configured to store executable instructions of the processor; where the processor is configured to execute the material handling method shown in FIG. 5 via executing the executable instructions.

The present embodiment further provides a warehousing system, including: a handling robot, a server, a shelf, and a workstation, where the handling robot is communicatively connected to the server; the server is configured to execute the material handling methods shown in FIG. 2, FIG. 3 and FIG. 4; and the handling robot is configured to execute the material handling method shown in FIG. 5, so as to implement material handling between the shelf and the workstation.

Figure 9:
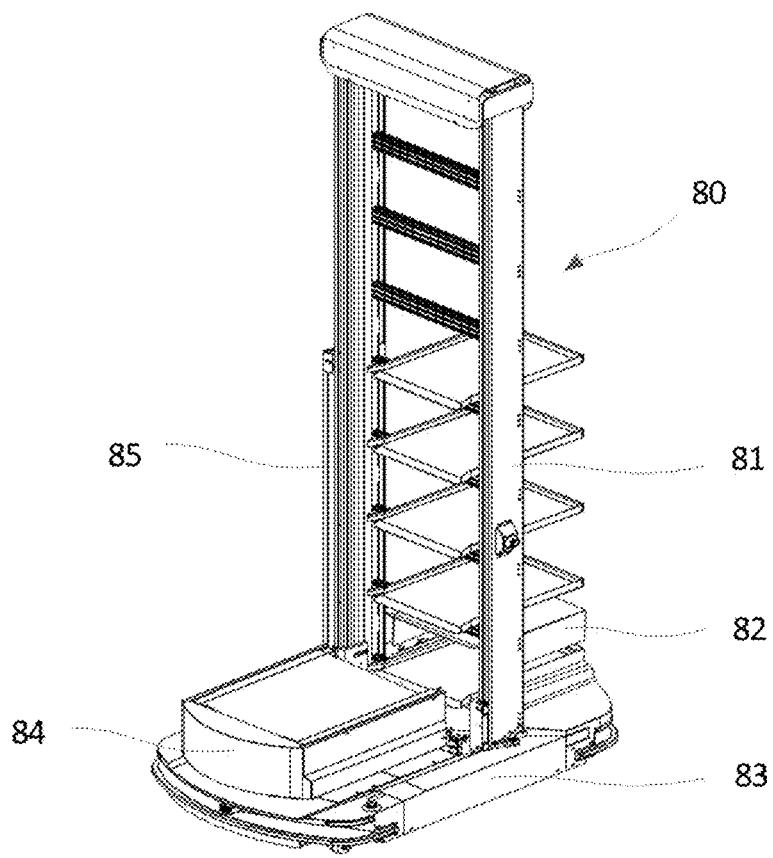
FIG. 9 is a schematic structural diagram of a robot according to an embodiment of the present disclosure.

FIG. 9 is a schematic structural diagram of a robot according to an embodiment of the present disclosure. As shown in FIG. 9, a robot 80 includes a robot body 81, a chassis 83, a handling device 84, an adjusting component 85, and several storage units 82 disposed on the robot body 81. The adjusting component 85 is configured to drive the handling device 84 to move up and down, which enables the handling device 84 to be aligned with any storage unit 82 on the robot body 81, or correspond to a storage site of the warehousing shelf where a target is located. The handling device 84 can rotate around a vertical direction as an axis to adjust an orientation so as to be aligned with the storage unit 82 or the storage site on the warehousing shelf. The handling device 84 is configured to perform loading or unloading of the target to perform handling of the target between the warehousing shelf and the storage unit.

The robot 80 in the above embodiment may execute the material handling method shown in FIG. 5 to implement the material handling between a shelf and a workstation.

Exemplarily, the robot 80 receives a handling task sent by a server, and determines a travel path according to a position of the target in the handling task. For example, during a process of traveling to a position of a first target, it is to first reach a position of a second target to execute a handling task, and then travel to the position of the first target to execute a handling task. It should be noted that, the handling task may be a material fetching task or a returning task.

Exemplarily, when the robot 80 executes the returning task, a return position of the target may be an initial storage position of the target of the returning task, or a position of an idle storage site; or a storage position of the target of the material fetching task.

Exemplarily, during a process of the robot 80 executing the material fetching task, the robot 80 moves to the storage position of the target of the material fetching task, and handle, by the adjusting component 85 in cooperation with the handling device 84, the target of the material fetching task from the storage site on the shelf to an idle storage unit on the robot body 81.

Exemplarily, during a process of the robot 80 executing the returning task, the robot 80 moves to a storage position corresponding to the return position, and handle, by the adjusting component 85 in cooperation with the handling device 84, the target from a storage unit of the robot body 81 to a storage site on the shelf. It should be noted that, the storage site on the shelf may be an initial storage position of the target or an idle storage site.

Exemplarily, when the target does not need to be returned to the initial storage position of the target, one way of improving efficiency is to fetch a target to be returned from the storage unit on the robot body 81, then control, by the adjusting component 85, the handling device 84 to place the target to be returned in a warehousing position vacated when the material fetching task is completed. That is to say, the warehousing position corresponding to the material fetching task and the warehousing position corresponding to the returning task are the same storage site. This way can reduce the total distance travelled by the robot when executing the handling task, and reduce the total time consumed by the robot when executing the handling task.

Figure 10:
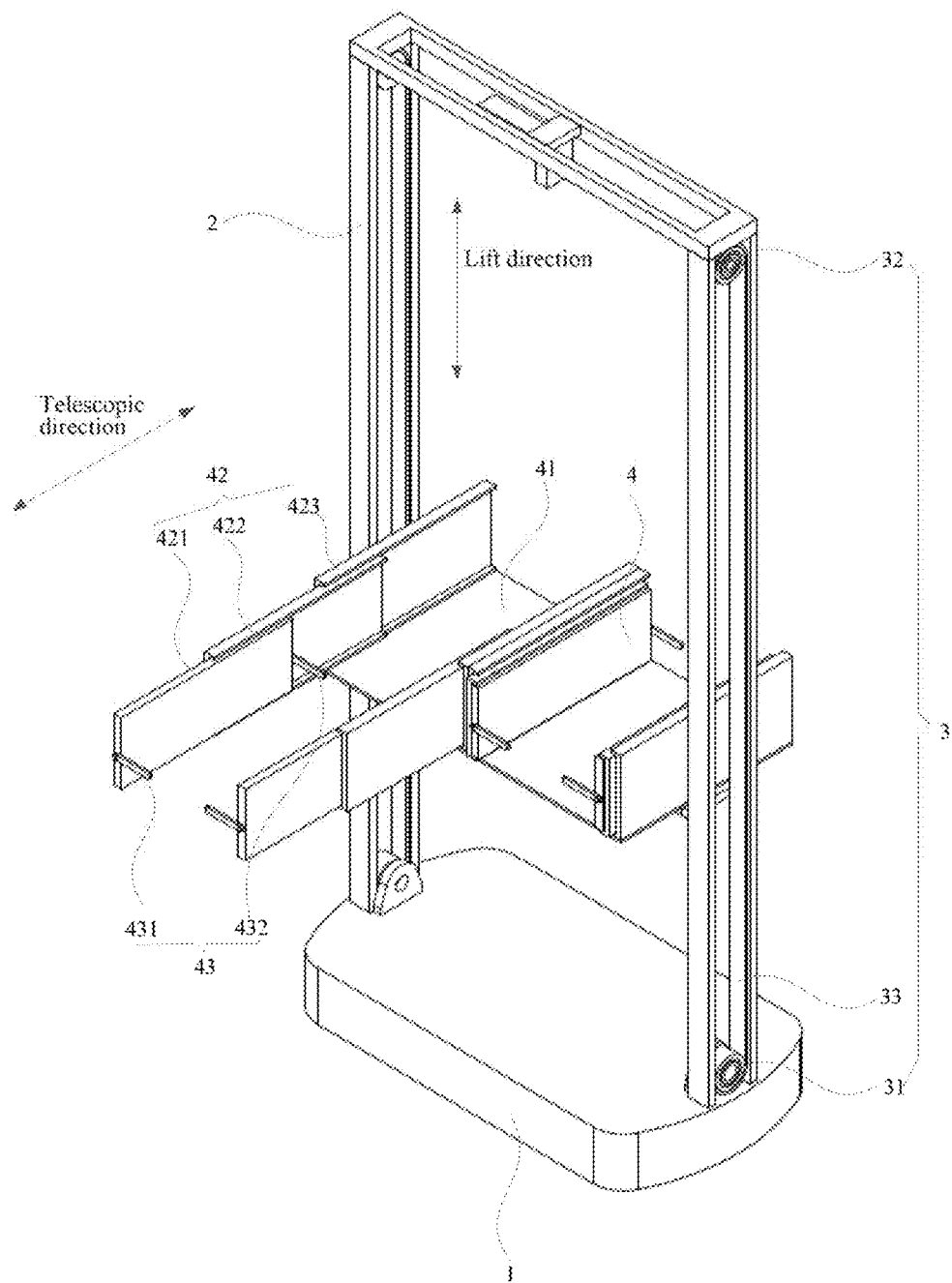
FIG. 10 is a first schematic structural diagram of a handling robot according to an embodiment of the present disclosure.

FIG. 10 is a schematic structural diagram of a handling robot according to an embodiment of the present disclosure. As shown in FIG. 10, the handling robot provided by the embodiment of the present disclosure includes a mobile chassis 1, a robot shelf 2, a lift device and a material handling device, where the mobile chassis 1 is a support structure of the handling robot, and is configured to support and carry other components and/or devices to move. In the present embodiment, the mobile chassis 1 may carry the robot shelf 2 and a target stored on the robot shelf 2 to move in a warehousing area.

The structure of the robot shelf 2 is not particularly limited in the present embodiment. For example, in a feasible implementation, as shown in FIG. 10, the robot shelf 2 includes two upright posts vertically disposed on the mobile chassis 1, and each handling mechanism 4 is mounted between the two upright posts and movable up and down relative to the upright posts.

Optionally, the robot shelf 2 includes three or more upright posts disposed on the mobile chassis 1 and in the same vertical plane, and each handling mechanism 4 is mounted between two adjacent upright posts and movable up and down relative to the upright posts. Two handling mechanisms located on the same layer may be designed as an integral structure, that is, there is no relative movement between the two handling mechanisms located on the same layer.

Figure 11:
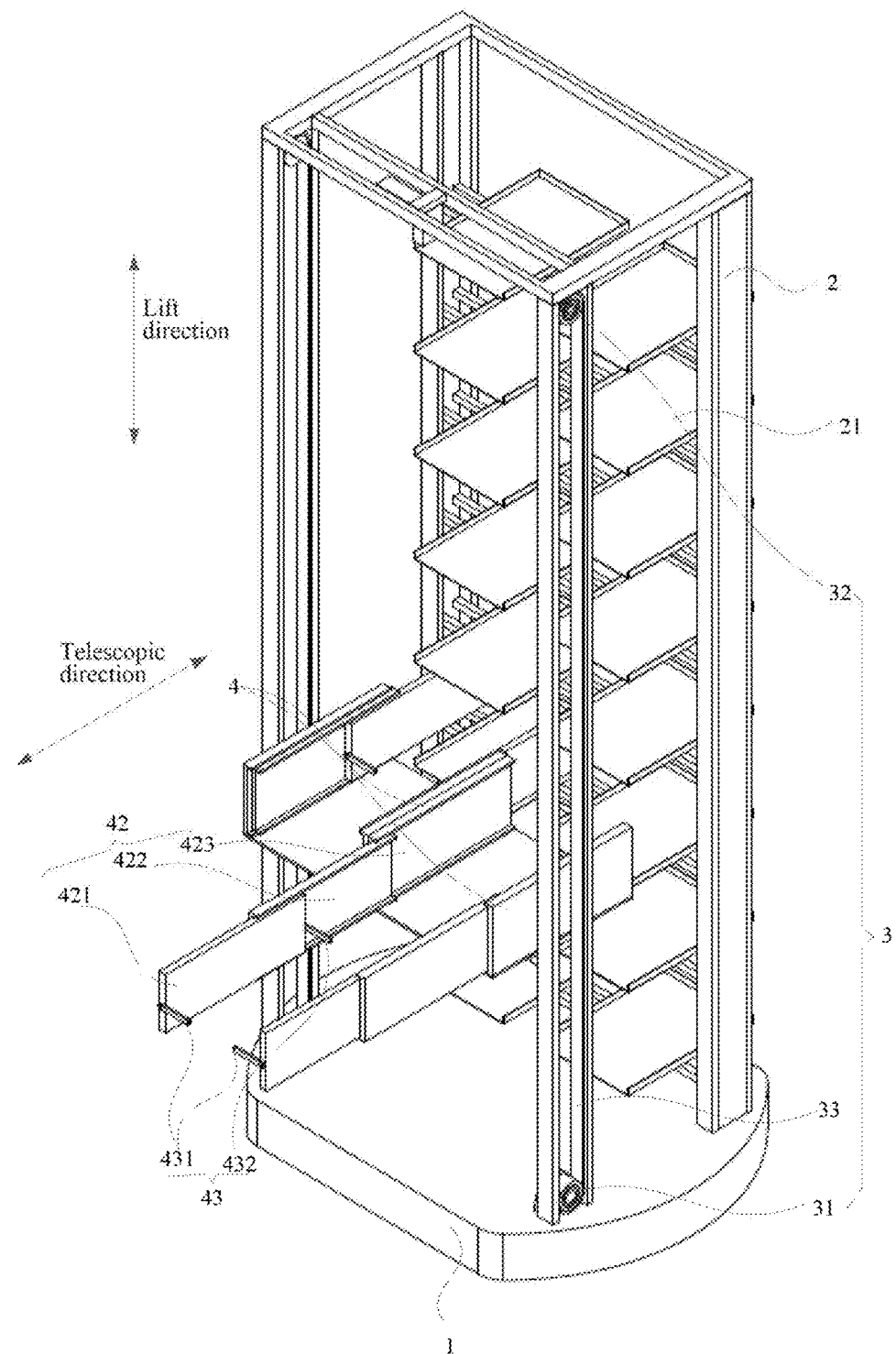
FIG. 11 is a second schematic structural diagram of a handling robot according to an embodiment of the present disclosure.

FIG. 11 is a schematic structural diagram of a second structure of a handling robot according to an embodiment of the present disclosure. As shown in FIG. 11, the robot shelf 2 includes four upright posts vertically disposed on the mobile chassis 1, the four upright posts may surround a cubic space, and a plurality of partition plates are disposed between the four upright posts. The plurality of partition plates divide the cubic space into a plurality of storage positions 21 for storing targets, and each storage position 21 may place one or more targets.

The lift device and the material handling device are mounted on the robot shelf 2, and the lift device is configured to drive the material handling device to move up and down relative to the robot shelf 2, so as to enable the material handling device to handle targets at different heights.

Optionally, the lift device generally includes two lift components 3, the two lift components 3 are mounted to opposite two sides of the robot shelf 2 respectively and are opposite to each other, for example, they are respectively mounted to two opposite upright posts close to the warehousing shelf. The material handling device is located between the two lift components 3, two ends of the material handling device are connected to the two lift components 3 respectively, and the two lift components 3 drive the material handling device to move up and down relative to the robot shelf 2.

Specifically, each lift component 3 includes a driving wheel 31, a driven wheel 32 and a transmission belt 33, where the driving wheel 31 is mounted at the bottom of the robot shelf 2, the driven wheel 32 is mounted at the top of the robot shelf 2, and the transmission belt 33 is sleeved on the driving wheel 31 and the driven wheel 32. The driving wheel 31 may be connected to an output shaft of a motor, to enable the motor to drive the driving wheel 31 to rotate, and the driving wheel 31 drives the transmission belt 33 to move, and the transmission belt 33 drives the material handling device to move up and down. When the motor is rotating forward or backward, the motor drives the driving wheel 31 to rotate forward or backward, the transmission belt 33 drives the material handling device to move up or down, and thereby enables the material handling device to fetch targets at different positions or heights or place targets to storage sites at different positions or heights on the warehousing shelf.

Exemplarily, both the driving wheel 31 and the driven wheel 32 are a belt pulley, the transmission belt 33 is a flat belt, an open-loop flat belt, etc. In this way, the material handling device is driven to move up and down relative to the robot shelf 2 by means of belt transmission, and the structure is simple.

On the basis of the described embodiment, in order to improve the handling efficiency, the material handling device includes at least two handling mechanisms 4, the at least two handling mechanisms 4 are disposed in the same layer and are connected together and mounted to the robot shelf 2, and each handling mechanism 4 is configured to store and fetch a target.

It can be understood that, the at least two handling mechanisms 4 means that there are two or more handling mechanisms 4.

Exemplarily, the material handling device includes two handling mechanisms 4 disposed in the same layer and connected together. For convenience of description, in the present embodiment, the two handling mechanisms 4 are represented by a first handling mechanism and a second handling mechanism, and the first handling mechanism and the second handling mechanism are disposed in the same layer and are connected together and mounted to the robot shelf 2, where the first handling mechanism and the second handling mechanism may be connected by an installation plate or the like, so that there is no relative movement between the first handling mechanism and the second handling mechanism.

Optionally, when the handling task is executed, the first handling mechanism and the second handling mechanism may be configured to fetch different targets from the warehousing shelf simultaneously, so as to implement a handling strategy of simultaneous fetch; or to store a plurality of targets onto different storage sites of the warehousing shelf simultaneously, so as to implement a handling strategy of simultaneous storage; or the first handling mechanism is configured to fetch a target on the warehousing shelf, and the second handling mechanism is configured to store a target to be stored into an idle storage site of the warehousing shelf, so as to implement a handling strategy of storing while fetching. It can be understood that, the idle storage site of the warehousing shelf includes an idle storage site which is vacated after the first handling mechanism fetches the target. In this way, the handling robot can execute a plurality of material fetching tasks simultaneously, or execute a plurality of storage tasks simultaneously, or execute material fetching and storage tasks simultaneously. Thus, the handling efficiency of the handling robot can be improved, and the consumed time for the handling robot to store and fetch the target is reduced.

Exemplarily, when the handling tasks of the first handling mechanism and the second handling mechanism are both material fetching tasks, according to a current position of the handling robot and a position of a target to be fetched, a material fetching path of the first handling mechanism or the second handling mechanism is generated; then, one or more material fetching tasks of the other handling mechanism 4 are inserted into the material fetching path. As such, an object of fetching a plurality of targets simultaneously is realized, improving the handling efficiency of the handling robot, and reducing the consumed time for fetching the targets.

Or, the handling tasks of the first handling mechanism and the second handling mechanism are both storing targets in idle storage sites of the warehousing shelf. In this case, according to the current position of the handling robot and positions of the idle storage sites of the warehousing shelf corresponding to target storing, a storage path of the first handling mechanism or the second handling mechanism is generated; then, one or more storing tasks of the other handling mechanism 4 are inserted into the path. As such, an object of storing a plurality of targets simultaneously is achieved, improving the handling efficiency of the handling robot, and reducing the consumed time for storing the targets.

Or, the handling task of the first handling mechanism is a material fetching task, the handling task of the second handling mechanism is a storing task. In this case, according to the current position of the handling robot and the position of the target to be fetched of the first handling mechanism, a material fetching path is generated, and then one or more storing tasks of the second handling mechanism are inserted into the material fetching path. As such, a handling strategy of storing while fetching is implemented, improving the handling efficiency of the handling robot, and reducing the consumed time for fetching and storing the targets.

It should be noted that, the handling task of the first handling mechanism may also be the storing task, and the handling task of the second handling mechanism is the material fetching task. In this case, the handling principle is the same as that of the above embodiment, and thus will not be described herein.

In an embodiment, the handling task of the first handling mechanism is the material fetching task, the handling task of the second handling mechanism is the storing task, and after the first handling mechanism fetches a target, the second handling mechanism stores a target to be stored in an idle storage site which is vacated after the first handling mechanism fetches the material. In this case, the handling robot only needs to move in a horizontal direction to enable the second handling mechanism to be aligned with an idle storage site vacated after the first handling mechanism fetches the material, no excessive movement in other paths is required, the consumed time of storing the target is the shortest, and the handling efficiency is the highest.

Further, the handling mechanism 4 includes a temporary storage pallet 41 and a telescopic arm 42 mounted to the temporary storage pallet 41, where the temporary storage pallet 41 is configured to temporarily store materials which move between the warehousing shelf and the robot shelf 2, where the temporary storage pallet 41 may be a metal flat plate, a non-metal flat plate, which are placed horizontally, or the like. The telescopic arm 42 is mounted to the temporary storage pallet 41, and the telescopic arm 42 is moveable along a telescopic direction, which enables the telescopic arm 42 to pull a target on the warehousing shelf or the robot shelf 2 onto the temporary storage pallet 41, or push a target on the temporary storage pallet 41 onto the warehousing shelf or the robot shelf 2.

Optionally, there are two telescopic arms 42, and the two telescopic arms 42 are disposed in parallel and oppositely on both sides of the temporary storage pallet 41, and the two telescopic arms 42 jointly pull the target on the warehousing shelf or the robot shelf 2 onto the temporary storage pallet 41, or push the target on the temporary storage pallet 41 onto the idle storage site of the warehousing shelf or the storage position 21 on the robot shelf 2.

In a feasible embodiment, the telescopic arm 42 includes an outer section arm 423, an inner section arm 421, and a handling component. Optionally, the handling component may be a pusher component 43, where the outer section arm 423 is mounted to the temporary storage pallet 41, the inner section arm 421 is mounted to the outer section arm 423, the pusher component 43 is mounted to the inner section arm 421, and the inner section arm 421 is movable relative to the outer section arm 423. Thus the inner section arm 421 can drive the pusher component 43 to move, so as to enable the pusher component 43 to push the target to move.

That is to say, opposite two sides of the temporary storage pallet 41 are provided with the outer section arm 423, the inner section arm 421 mounted to the outer section arm 423, and the pusher component 43 mounted to the inner section arm 421.

The pusher component 43 includes a first pusher 431, and the first pusher 431 is mounted to a front end surface of the inner section arm 421, where the front end of the inner section arm 421 refers to an end close to the warehousing shelf. Since there are two telescopic arms 42, which are disposed in parallel and oppositely on the temporary storage pallet 41, and thus, there are also two inner section arms that are in parallel and opposite to each other, and the first pushers 431 are disposed on the front end surfaces of the two inner section arms 421. The two first pushers 431 can rotate simultaneously to a horizontal position and are disposed opposite to each other, or the two first pushers 431 rotate simultaneously to a vertical position.

Optionally, the handling component may be a clamping component, and the target may be handled by clamping the target in combination with movement of the handling component driven by the inner section arm 421. The clamping component is mounted to inner side of the inner section arm 421 and can be telescopable in opposite directions, or the telescopic arm 42 is designed to be telescopable in opposite directions to form a structure capable of clamping or releasing the target. In the corresponding example of a robot structure of the present application, the handling component is also applicable to a design of the same or a similar handling mechanism, such as the pusher component 43, the clamping component, a machine clamping arm, a sucker handling assembly, and the like, and is not limited thereto.

When the target on the warehousing shelf needs to be fetched, the material handling device first moves up and down until the temporary storage pallet 41 is aligned with the storage site of the target to be fetched, and the inner section arm 421 moves toward the target, and at this time, the first pusher 431 on the inner section arm 421 is in a vertical state. When the front end of the inner section arm 421 moves to a rear end of the target, the first pusher 431 rotates to a horizontal state, and the first pusher 431 abuts against a rear end surface of the target. At this time, the inner section arm 421 moves toward the temporary storage pallet 41, and the first pusher 431 pushes the target to move toward the temporary storage pallet 41, thereby handling the target from the warehousing shelf onto the temporary storage pallet 41. When the target on the temporary storage pallet 41 needs to be stored onto the warehousing shelf, the first pusher 431 pushes a front end of the target, and the inner section arm 421 moves toward the warehousing shelf to push the target to the idle storage site of the warehousing shelf, where the front end of the target refers to an end close to the temporary storage pallet 41, and an end opposite to the front end of the target is the rear end of the target.

Further, the pusher component 43 further includes a second pusher 432, the second pusher 432 is mounted to the rear end surface of the inner section arm 421 and rotatable to a horizontal or vertical position relative to the rear end surface of the inner section arm 421, so that the second pusher 432 can push the target on the temporary storage pallet 41 onto the robot shelf 2, or push the target on the robot shelf 2 onto the temporary storage pallet 41.

Specifically, when the target on the storage position 21 corresponding to the robot shelf 2 needs to be handled onto the temporary storage pallet 41, the second pusher 432 is in the vertical state firstly, and the inner section arm 421 moves toward the robot shelf 2. When the front end surface of the inner section arm 421 moves to the rear end surface of the target, the second pusher 432 rotates to the horizontal state, and the second pusher 432 abuts against the rear end surface of the target. At this time, the inner section arm 421 moves toward the direction of the temporary storage pallet 41, and the second pusher 432 pushes the target to move toward the temporary storage pallet 41, thereby moving the target onto the temporary storage pallet 41. When the target on the temporary storage pallet 41 needs to be handled to a corresponding storage position 21 on the robot shelf 2, the second pusher 432 abuts against the front end of the target, and the inner section arm 421 drives the second pusher 432 to move towards the storage position 21 on the robot shelf 2, so as to push the target on the temporary storage pallet 41 to the corresponding storage position 21.

On the basis of the above embodiment, in order to extend a telescopic path of the telescopic arm 42, the telescopic arm 42 further includes at least one middle section arm 422, the middle section arm 422 is mounted between the inner section arm 421 and the outer section arm 423, and is connected to the inner section arm 421 and the outer section arm 423, the middle section arm 422 is movable relative to the outer section arm 423, and the inner section arm 421 is movable relative to the middle section arm 422, where the telescopic arm 42 may be provided with a plurality of middle section arms 422 between the inner section arm 421 and the outer section arm 423 according to a telescopic length, so as to increase a movement path of the telescopic arm to implement storing and fetching a target with a larger size.

Further, the pusher component further includes a driving member, where the driving member is connected to the first pusher 431 and the second pusher 432 respectively, and the first pusher 431 and the second pusher 432 are driven to rotate relative to an end surface of the inner section arm 421 through the driving member, so that the first pusher 431 and the second pusher 432 may rotate to a horizontal or vertical position.

In the handling robot provided by the embodiment of the present disclosure, the material handling device includes at least two handling mechanisms, and each handling mechanism is disposed in the same layer and is connected integrally. When the handling robot is adopted to perform a handling operation, these handling mechanisms can execute a plurality of handling tasks simultaneously to realize a handling strategy of fetching simultaneously, storing simultaneously, or storing while fetching, thereby improving the handling efficiency, and reducing the consumed time for storing and fetching the target.

Figure 12:
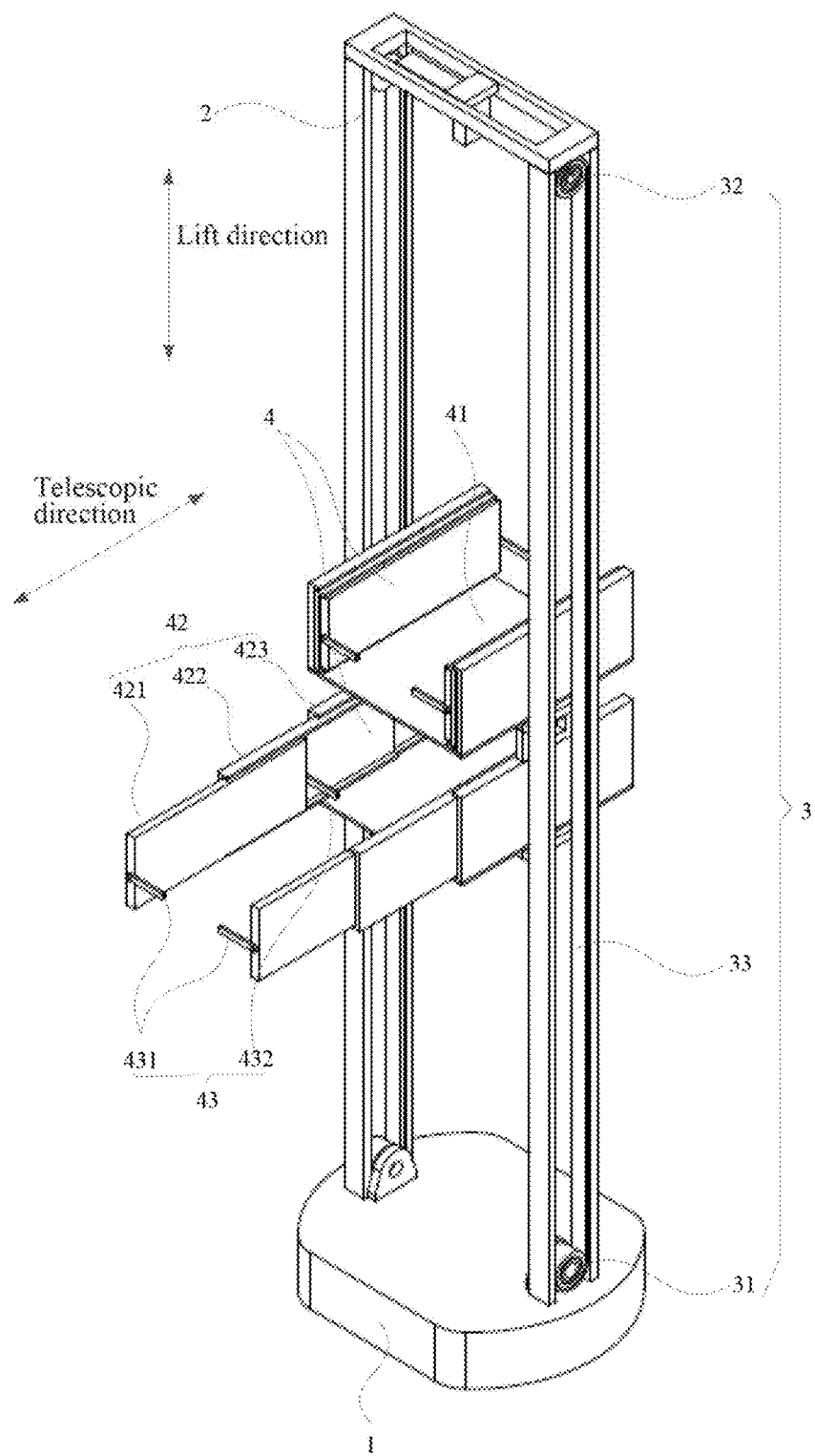
FIG. 12 is a third schematic structural diagram of a handling robot according to an embodiment of the present disclosure.

FIG. 12 is a third schematic structural diagram of a handling robot according to an embodiment of the present disclosure. As shown in FIG. 12, the handling robot provided by the embodiment of the present disclosure includes: a mobile chassis 1, a robot shelf 2, a lift device and at least two handling mechanisms 4, where the mobile chassis 1 is a support structure of a handling robot, configured to support and carry other components and/or devices of the handling robot to move. In the present embodiment, the robot shelf 2 is mounted to the mobile chassis 1 fixedly. In this way, the mobile chassis 1 may carry the robot shelf 2 and the target stored on the robot shelf 2 to move within a warehousing area.

The structure of the robot shelf 2 is not particularly limited in the present embodiment. For example, in a feasible implementation, as shown in FIG. 10, the robot shelf 2 includes two upright posts vertically disposed on the mobile chassis 1, and each handling mechanism 4 is mounted between the two upright posts and can move up and down relative to the upright posts.

Figure 13:
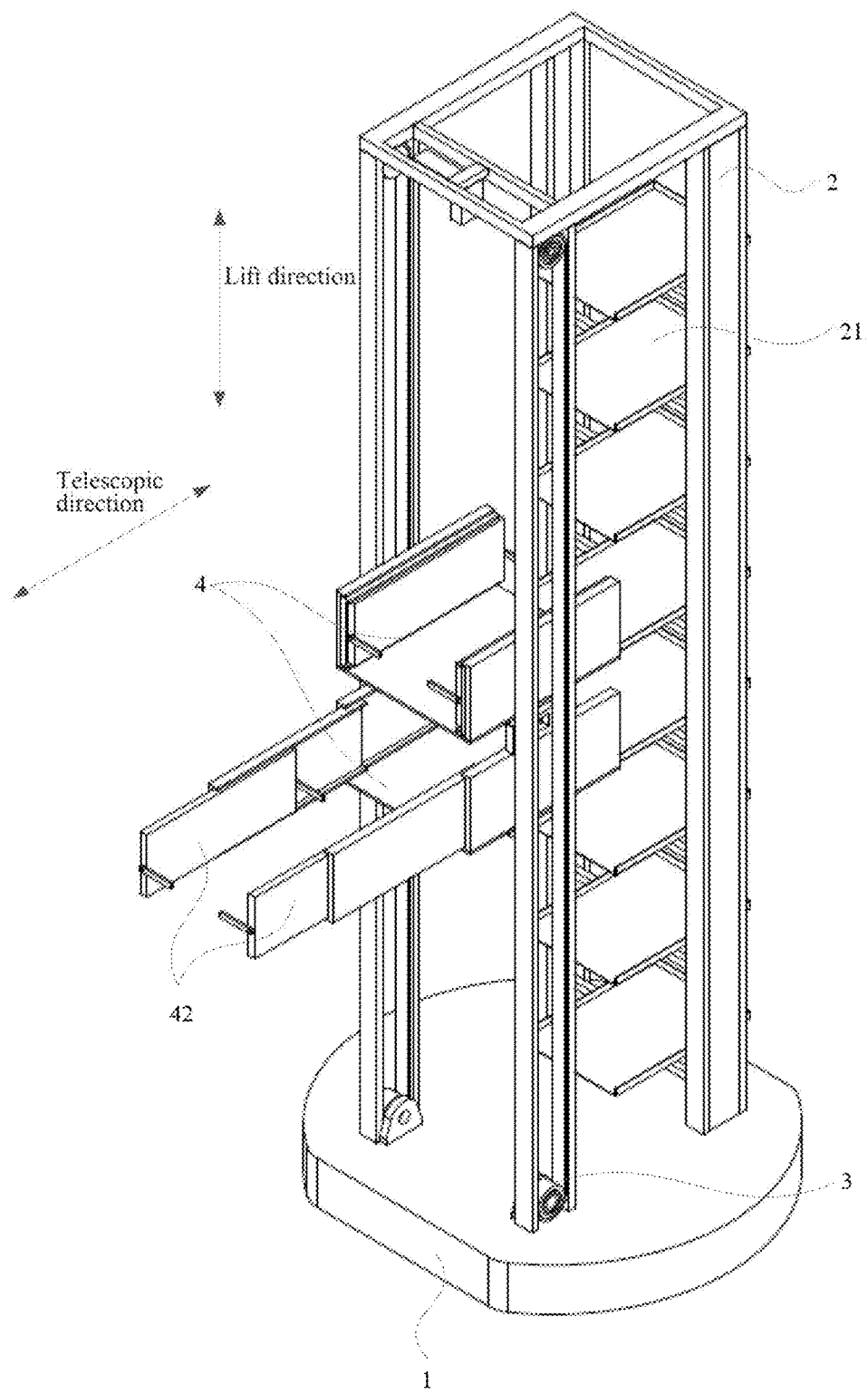
FIG. 13 is a fourth schematic structural diagram of a handling robot according to an embodiment of the present disclosure.

FIG. 13 is a fourth structural schematic diagram of a handling robot according to an embodiment of the present disclosure. As shown in FIG. 13, the robot shelf 2 includes four upright posts vertically disposed on the mobile chassis 1, the four upright posts may surround a cubic space, and a plurality of partition plates are disposed between the four upright posts. The plurality of partition plates divide the cubic space into a plurality of storage positions 21 for storing targets, and each storage position 21 may place one or more targets.

It can be understood that, at least two handling mechanisms 4 means that there are two or more handling mechanisms 4. In an embodiment, there are two handling mechanisms 4, and the two handling mechanisms 4 may be connected integrally through a connecting plate.

The lift device and the two or more handling mechanisms 4 are mounted to the robot shelf 2, and the lift device is configured to drive each handling mechanism 4 to move up and down relative to the robot shelf 2, so that each handling mechanism 4 can handle targets at different heights. Optionally, the lift device generally includes two lift components 3, and the two lift components 3 are mounted to opposite two sides of the robot shelf 2 respectively and are opposite to each other, for example, they are mounted to two opposite upright posts close to the warehousing shelf respectively. Each handling mechanism 4 is located between the two lift components 3, two ends of the handling mechanism 4 are connected to the two lift components 3 respectively, and the lift components drive the handling mechanism 4 to move up and down relative to the robot shelf 2.

Specifically, a lift component 3 includes a driving wheel 31, a driven wheel 32 and a transmission belt 33, where the driving wheel 31 is mounted at the bottom of the robot shelf 2, the driven wheel 32 is mounted at the top of the robot shelf 2, and the transmission belt 33 is sleeved on the driving wheel 31 and the driven wheel 32. The driving wheel 31 may be connected to an output shaft of a motor, to enable the motor to drive the driving wheel 31 to rotate, and the driving wheel 31 drives the transmission belt 33 to move, and the transmission belt 33 drives each handling mechanism 4 to move up and down. When the motor is rotating forward or backward, the motor drives the driving wheel 31 to rotate forward or backward, the transmission belt 33 drives each handling mechanism 4 to move up or down, and thus enables each handling mechanism 4 to fetch targets at different heights or place targets to storage sites at different heights on the warehousing shelf.

On the basis of the above embodiment, in order to improve the handling efficiency, two or more handling mechanisms 4 are disposed in different layers along the lift direction, and when the handling robot is adopted to perform a handling operation, these handling mechanisms can execute a plurality of handling tasks simultaneously to realize a handling strategy of fetching simultaneously, storing simultaneously, or storing while fetching, thereby improving the handling efficiency, and reducing the consumed time for storing and fetching the targets.

Exemplarily, there are two handling mechanisms 4, and the two handling mechanisms 4 are disposed in different layers along the lift direction. For convenience of description, in the present embodiment, the two handling mechanisms 4 are represented by a first handling mechanism and a second handling mechanism respectively, and the first handling mechanism and the second handling mechanism are disposed in different layers on the robot shelf 2 along the lift direction.

When the handling task is executed, the first handling mechanism and the second handling mechanism may be configured to fetch different targets from the warehousing shelf simultaneously; or to store a plurality of targets into different storage sites of the warehousing shelf simultaneously; or the first handling mechanism is configured to fetch a target on the warehousing shelf, and the second handling mechanism is configured to store a target to be stored into an idle storage site of the warehousing shelf. It can be understood that, the idle storage site of the warehousing shelf includes an idle storage site which is vacated after the first handling mechanism fetches a target. In this way, the handling robot can execute a plurality of material fetching tasks simultaneously, or execute a plurality of storing tasks simultaneously, or execute material fetching and storing tasks simultaneously. Thus, the handling efficiency of the handling robot can be improved, and the consumed time for the handling robot to store and fetch the target is reduced.

Exemplarily, when the handling tasks of both the first handling mechanism and the second handling mechanism are a material fetching task, according to a current position of the handling robot and a position of a target to be fetched, a material fetching path of the first handling mechanism or the second handling mechanism is generated; then, one or more material fetching tasks of the other handling mechanism 4 are inserted into the material fetching path. As such, an object of fetching a plurality of targets simultaneously at one time is realized, improving the handling efficiency of the handling robot, and reducing the consumed time for fetching the target.

Or, the handling tasks of both the first handling mechanism and the second handling mechanism are storing targets in idle storage sites of the warehousing shelf. In this case, according to the current position of the handling robot and positions of the idle storage sites of the warehousing shelf corresponding to target storing, a storage path of the first handling mechanism or the second handling mechanism is generated; then, one or more storing tasks of the other handling mechanism 4 are inserted into the path. As such, an object of storing a plurality of targets simultaneously is achieved, improving the handling efficiency of the handling robot, and reducing the consumed time for storing a target.

Or, the handling task of the first handling mechanism is a material fetching task, the handling task of the second handling mechanism is a storing task. In this case, according to the current position of the handling robot and the position of the target to be fetched of the first handling mechanism, a material fetching path is generated, and then one or more storing tasks of the second handling mechanism are inserted into the material fetching path. As such a handling strategy of storing while fetching is achieved, improving the handling efficiency of the handling robot, and reducing the consumed time for storing and fetching a target.

It should be noted that, the handling task of the first handling mechanism may also be the storing task, and the handling task of the second handling mechanism is the material fetching task, and the handling principle is the same as that of the above embodiment, and will not be described herein.

In an embodiment, the handling task of the first handling mechanism is the material fetching task, the handling task of the second handling mechanism is the storing task, and after the first handling mechanism fetches a target, the second handling mechanism stores a target to be stored into an idle storage site which is vacated after the first handling mechanism fetches the material. In this case, the second handling mechanism only needs to move along the lift direction, no excessive movement in other paths is required, the consumed time for storing the target is the shortest, and the handling efficiency is the highest.

Further, the handling mechanism 4 includes a temporary storage pallet 41 and a telescopic arm 42 mounted to the temporary storage pallet 41, where the temporary storage pallet 41 is configured to temporarily store materials which move between the warehousing shelf and the robot shelf 2, where the temporary storage pallet 41 may be a metal flat plate, a non-metal flat plate, which are placed horizontally, or the like. The telescopic arm 42 is mounted to the temporary storage pallet 41, and the telescopic arm 42 can move in a direction toward or away from the target, which enables the telescopic arm 42 to pull a target on the warehousing shelf or the robot shelf 2 onto the temporary storage pallet 41, or push a target on the temporary storage pallet 41 onto the warehousing shelf or the robot shelf 2.

Optionally, there are two telescopic arms 42, and the two telescopic arms 42 are disposed opposite to each other on both sides of the temporary storage pallet 41, and the two telescopic arms 42 jointly pull the target on the warehousing shelf or the robot shelf 2 onto the temporary storage pallet 41, or push the target on the temporary storage pallet 41 onto the idle storage site of the warehousing shelf or the storage position 21 on the robot shelf 2.

In a feasible embodiment, the telescopic arm 42 includes an outer section arm 423, an inner section arm 421 and a pusher component 43, where the outer section arm 423 is mounted to the temporary storage pallet 41, the inner section arm 421 is mounted to the outer section arm 423, the pusher component 43 is mounted to the inner section arm 421, and the inner section arm 421 is movable relative to the outer section arm, and thus the inner section arm 421 drives the pusher component 43 to move, which enables the pusher component 43 to push the target to move.

The pusher component 43 includes a first pusher 431, and the first pusher 431 is mounted to a front end surface of the inner section arm 421, where the front end of the inner section arm 421 refers to an end close to the warehousing shelf. It can be understood that, in the two telescopic arms 42 which are disposed in parallel and opposite to each other, the first pushers 431 are disposed on the front end surfaces of the two inner section arms 421, and the two first pushers 431 can rotate simultaneously to a horizontal position and are disposed opposite to each other, or the two first pushers 431 rotate simultaneously to a vertical position.

When a target on the warehousing shelf needs to be fetched, each handling mechanism first moves up and down in the lift direction along with the lift component until the temporary storage pallet 41 is aligned with the storage site of the target to be fetched, and the inner section arm 421 moves toward the target, and at this time, the first pusher 431 on the inner section arm 421 is in a vertical state. When the front end of the inner section arm 421 moves to a rear end of the target, the first pusher 431 rotates to a horizontal state, and the first pusher 431 abuts against a rear end surface of the target. At this time, the inner section arm 421 moves toward the temporary storage pallet 41, and the first pusher 431 pushes the target to move toward the temporary storage pallet 41, thereby handling the target from the warehousing shelf onto the temporary storage pallet 41. When a target on the temporary storage pallet 41 needs to be stored onto the warehousing shelf, the first pusher 431 pushes a front end of the target, and the inner section arm 421 moves toward the warehousing shelf to push the target to an idle storage site of the warehousing shelf, where the front end of the target refers to an end close to the temporary storage pallet 41, and an end opposite to the front end of the target is the rear end of the target.

Further, the pusher component 43 further includes a second pusher 432, the second pusher 432 is mounted to the rear end surface of the inner section arm 421 and rotatable to a horizontal or vertical position relative to the rear end surface of the inner section arm 421, so that the second pusher 432 can push the target on the temporary storage pallet 41 onto the robot shelf 2, or push the target on the robot shelf 2 onto the temporary storage pallet 41.

Specifically, when a target on a storage position 21 corresponding to the robot shelf 2 needs to be handled to the temporary storage pallet 41, the second pusher 432 is in the vertical state firstly, and the inner section arm 421 moves toward the robot shelf 2. When the front end surface of the inner section arm 421 moves to the rear end surface of the target, the second pusher 432 rotates to the horizontal state, and the second pusher 432 abuts against the rear end surface of the target. At this time, the inner section arm 421 moves toward the direction of the temporary storage pallet 41, and the second pusher 432 pushes the target to move toward the temporary storage pallet 41, thereby moving the target onto the temporary storage pallet 41. When a target on the temporary storage pallet 41 needs to be handled to a corresponding storage position 21 on the robot shelf 2, the second pusher 432 abuts against the front end of the target, and the inner section arm 421 drives the second pusher 432 to move towards the storage position 21 on the robot shelf 2, so as to push the target on the temporary storage pallet 41 to the corresponding storage position 21.

On the basis of the above embodiment, in order to extend a telescopic path of the telescopic arm 42, the telescopic arm 42 further includes at least one middle section arm 422, the middle section arm 422 is mounted between the inner section arm 421 and the outer section arm 423, and is connected to the inner section arm 421 and the outer section arm 423, the middle section arm 422 is movable relative to the outer section arm 423, and the inner section arm 421 is movable relative to the middle section arm 422, where the telescopic arm 42 may be provided with a plurality of middle section arms 422 between the inner section arm 421 and the outer section arm 423 according to a telescopic length, so that the telescopic arm 42 can push a target to a farther position, or push a target at a farther position onto the temporary storage pallet 41 or the robotic shelf 2.

Further, the pusher component 43 further includes a driving member, the driving member is connected to the first pusher 431 and the second pusher 432 respectively, and the first pusher 431 and the second pusher 432 are driven to rotate relative to an end surface of the inner section arm 421 through the driving member, so that the first pusher 431 and the second pusher 432 rotate to a horizontal or vertical position.

Figure 14:
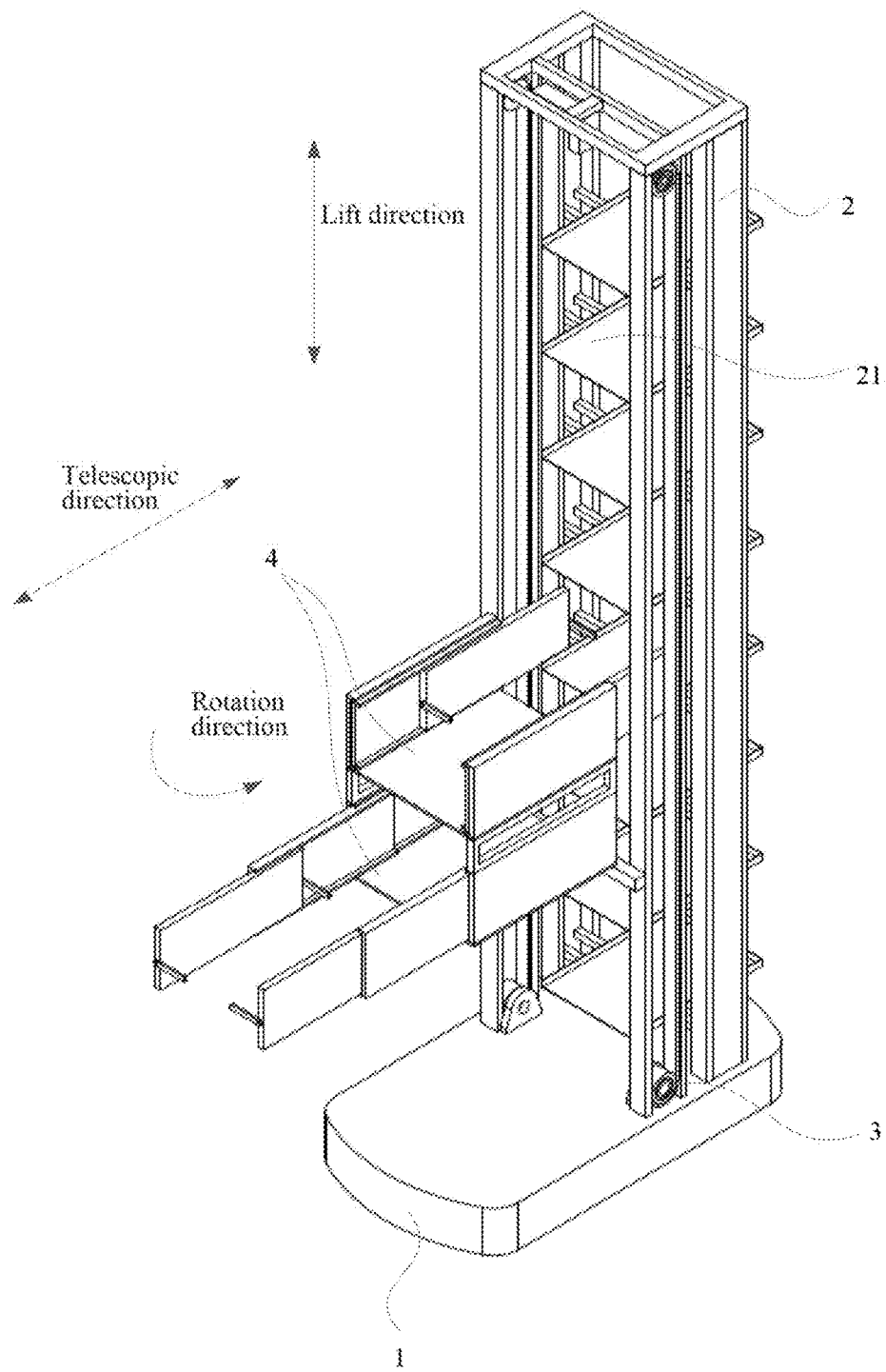
FIG. 14 is a fifth schematic structural diagram of a handling robot according to an embodiment of the present disclosure.
Figure 15:
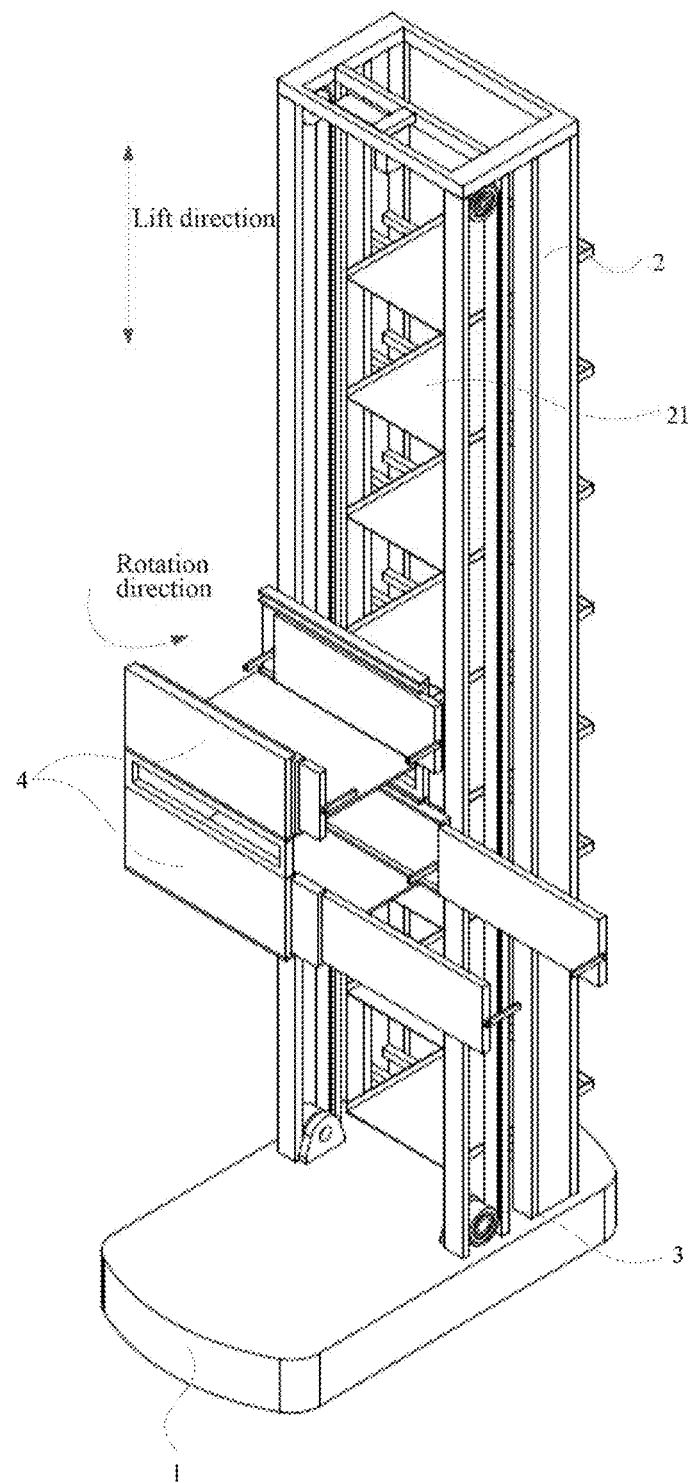
FIG. 15 is a sixth schematic structural diagram of a handling robot according to an embodiment of the present disclosure.
Figure 16:
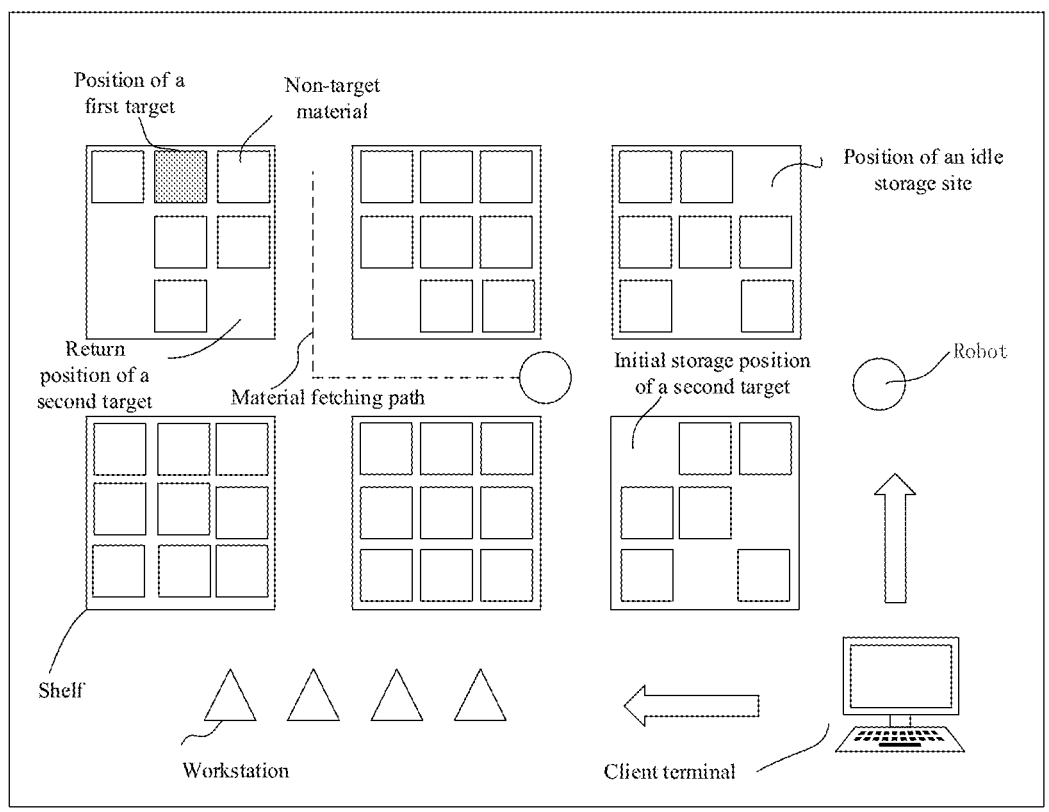
Figure 17:
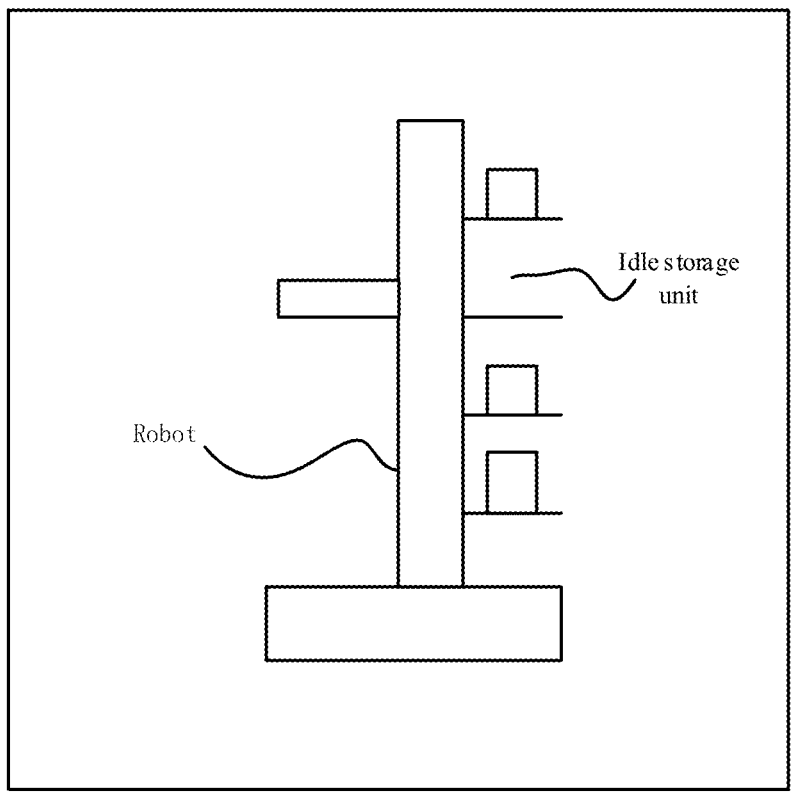
Figure 18:
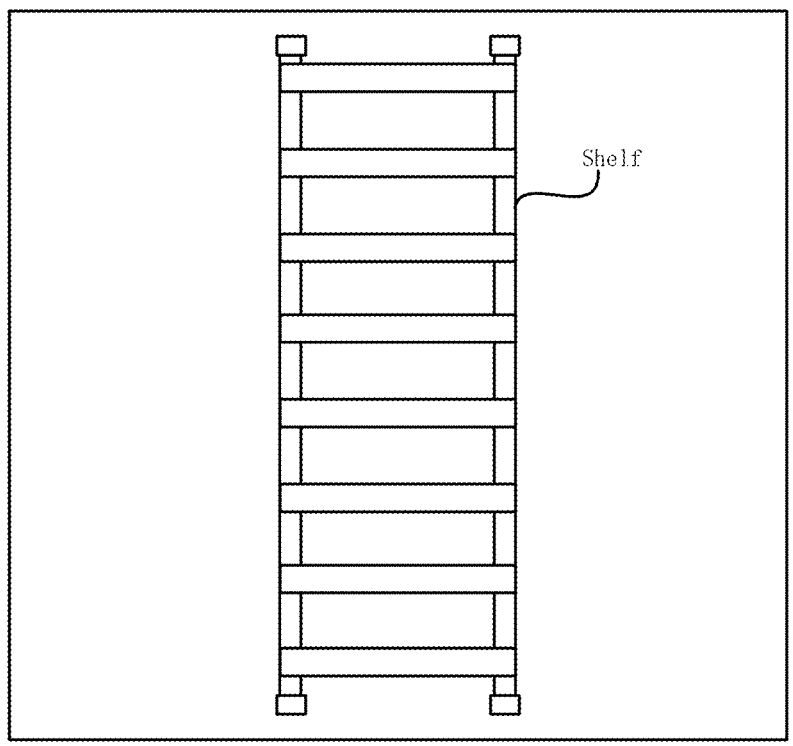

FIG. 14 is a fifth schematic structural diagram of a handling robot according to an embodiment of the present disclosure, and FIG. 15 is a sixth schematic structural diagram of a handling robot according to an embodiment of the present disclosure. On the basis of the above embodiments, the handling robot provided by the present embodiment further includes a support beam, and the support beam is mounted to the robot shelf 2 and movable up and down relative to the robot shelf 2, and each handling mechanism 4 is mounted to the support beam, so as to enable each handling mechanism 4 to move up and down relative to the robot shelf 2.

The handling robot further includes an installation bracket (not shown in the figures) and a slewing component (not shown in the figures) mounted to the installation bracket, each handling mechanism 4 is mounted to the slewing component, the installation bracket is mounted to the support beam, and the slewing component is configured to drive each handling mechanism to rotate in a plane perpendicular to a lift direction of the support beam, so as to enable the handling mechanism 4 to rotate to different directions.

The installation bracket includes two installation plates disposed opposite to each other and a load-bearing beam connected to the two installation plates, and the two installation plates are connected to the support beam. The slewing component includes a load-bearing plate mounted to the load-bearing beam, a rotation plate disposed apart from the load-bearing plate, and an cross bearing for connecting the load-bearing plate and the rotation plate, a first sprocket is connected to the cross bearing, and a second sprocket and a motor for driving the second sprocket to rotate are provided on the rotation plate, and the first sprocket and the second sprocket are connected through a chain. When the motor drives the second sprocket to rotate, the second sprocket drives the first sprocket to rotate through the chain, and when the first sprocket rotates, each handling mechanism 4 located on the rotation plate is driven to rotate around an axis of the first sprocket, so as to enable the at least two handling mechanisms 4 to rotate to different directions in a plane perpendicular to a lift direction of the support beam.

The handling robot provided by the embodiment of the present disclosure includes a robot shelf and two or more handling mechanisms disposed on the robot shelf, these handling mechanisms are disposed in different layers along the lift direction, and when the handling robot is adopted to perform a handling operation, these handling mechanisms can execute a plurality of handling tasks simultaneously so as to implement a handling strategy of fetching simultaneously, storing simultaneously, or storing while fetching, thereby improving the handling efficiency, and reducing the consumed time for storing and fetching a target.

The present embodiment further provides a readable storage medium, having a computer program stored therein, and when at least one processor of a server executes the computer program, the server executes the methods provided by the above various embodiments.

The present embodiment further provides a program product, where the program product includes a computer program, and the computer program is stored in a readable storage medium. At least one processor of a server may read the computer program from the readable storage medium, and the at least one processor executes the computer program to cause the server to implement the methods provided by the above various embodiments.

Finally, it should be noted that, the above embodiments are merely used for describing the technical solutions of the present disclosure, and are not to limit them. Although the present disclosure has been described in detail with reference to the foregoing embodiments, it should be understood by a person skilled in the art that the technical solutions described in the foregoing embodiments can be modified, or equivalent replacements can be made to some or all of the technical features therein. These modifications or replacements do not depart from the scope of the technical solutions in the embodiments of the present disclosure.

What is claimed is:

1. A material handling method, comprising:
   acquiring position information and idle storage unit information of a robot, by a processor; and
   allocating a second handling task to the robot according to the position information, the idle storage unit information and a position of a first target comprised in a first handling task, by the processor; wherein the first handling task is a material fetching task, and the second handling task is a returning task;
   when a return position in the second handling task is a position of an idle storage site, the allocating the second handling task to the robot comprises:
   generating a material fetching path according to the position information and a position of the first target comprised in the first handling task, by the processor; and determining positions corresponding to U idle storage sites whose distances from the material fetching path are within a first preset range as return positions of a second target, by the processor; wherein U is a natural number greater than 0; and/or
   determining, according to the position information, positions corresponding to U idle storage sites whose distances from the robot are within a second preset range as return positions of the second target; wherein U is a natural number greater than 0, by the processor.

2. The method according to claim 1, wherein the second handling task is allocated at any time point before, during, or after the first handling task is executed.

3. The method according to claim 1, wherein a change of a total quantity of the idle storage units for the robot to execute the first handling task is estimated, and the second handling task is inserted selectively before, during or after the first handling task.

4. The method according to claim 1, wherein the return position of the second target comprises any one of the following:
   an initial storage position of the second target, a position of the idle storage site, and the position of the first target.

5. The method according to claim 1, wherein before the allocating the second handling task to the robot, the method further comprises:
   determining whether a planned path corresponding to the second handling task complies with a reservation requirement; wherein the reservation requirement comprises that no robot travels on the planned path within a preset period of time.

6. The method according to claim 5, further comprising:
   reallocating the second handling task if the planned path does not comply with the reservation requirement,
   receiving a handling task cancellation request or a new handling task addition request sent by a client terminal; and
   reallocating the second handling task according to the handling task cancellation request or the new handling task addition request.

7. The method according to claim 1, wherein when the first handling task and the second handling task are allocated, any one or more of the following constraints to generate the planned path corresponding to the first handling task and the second handling task are considered:
   total movement time for the robot to complete the material fetching task and the returning task;
   a total number of times of material fetching operations and return operations performed by the robot when completing the material fetching task and the returning task;
   a total travel distance for the robot to complete the material fetching task and the returning task; and
   a load rate of the robot when completing the material fetching task and the returning task.

8. The method according to claim 1, wherein when a shelf for placing materials has two or more storage positions in a shelf depth direction, and a position of a target indicated by the material fetching task or the returning task is a second sequential position of storage positions or a position thereafter, the method further comprises:
   instructing the robot to handle a non-target material that is placed before the position of the target to an idle storage unit of the robot;
   instructing the robot to execute the material fetching task or the returning task for the position of the target; and
   instructing the robot to return the non-target material to an original storage position on the shelf, or return the non-target material to an idle storage position; wherein the idle storage position and the position of the target belong to the same shelf or different shelves.

9. The method according to claim 1, further comprising:
allocating a tally task to the robot, wherein the tally task comprises: performing material sorting on the first target or the second target, and/or adjusting a storage position of the first target or the second target; wherein:
execution timing of the tally task comprises any one of the following situations:
before the first handling task and the second handling task;
between the first handling task and the second handling task;
after the first handling task and the second handling task; and
during an execution process of any task in a task sequence constituted by the first handling task and the second handling task.

10. A material handling method, comprising:
acquiring a handling task sequence to execute a first handling task, by a processor; and
executing a second handling task during an execution process of the first handling task, by the processor, wherein the first handling task is a material fetching task and the second handling task is a returning task;
wherein the second handling task is obtained during the execution process of the first handling task, or the acquired handling task sequence comprises the first handling task and the second handling task;
when a return position of a second target corresponding to the second handling task is a position of an idle storage site, the return position of the second target is selected from acquired positions corresponding to U idle storage sites from the second handling task;
wherein distances between the positions corresponding to the U idle storage sites and a robot material fetching path are within a first preset range; and/or distances between the positions corresponding to the U idle storage sites and the robot are within a second preset range; wherein U is a natural number greater than 0; and the material fetching path is generated according to position information of the robot and a position of the first target comprised in the first handling task, by the processor.

11. The method according to claim 10, further comprising:
reporting, by a robot, at least one of position information of the robot and idle storage unit information to a server periodically or aperiodically; and/or
reporting, by a robot, at least one of position information of the robot and idle storage unit information to the server when receiving a request indication from a server.

12. The method according to claim 11, wherein the executing the second handling task during the execution process of the first handling task comprises:
acquiring a position of a first target from the first handling task, and acquiring a return position of a second target from the second handling task;
reaching the return position of the second target to execute the returning task, during travelling to the position of the first target; and
travelling to the position of the first target to execute the material fetching task.

13. The method according to claim 12, wherein the return position of the second target in the second handling task comprises any one of the following:
an initial storage position of the second target; or
a position of an idle storage site; or
the position of the first target.

14. The method according to claim 10, wherein the first handling task and the second handling task are related to any one or more of the following constraints to generate the planned path corresponding to the first handling task and the second handling task:
total movement time for the robot to complete the material fetching task and the returning task;
a total number of times of material fetching operations and return operations performed by the robot when completing the material fetching task and the returning task;
a total travel distance for the robot to complete the material fetching task and the returning task; and
a load rate of the robot when completing the material fetching task and the returning task.

15. A server, comprising:
a processor; and
a memory, configured to store executable instructions of the processor;
wherein the processor is configured to execute the executable instructions to enable the processor to:
acquire position information and idle storage unit information of a robot; and
allocate a second handling task to the robot according to the position information, the idle storage unit information and a position of a first target comprised in a first handling task; wherein the first handling task is a material fetching task, and the second handling task is a returning task;
when a return position in the second handling task is a position of an idle storage site, the allocate the second handling task to the robot comprises:
generate a material fetching path according to the position information and a position of the first target comprised in the first handling task; and determine positions corresponding to U idle storage sites whose distances from the material fetching path are within a first preset range as return positions of a second target; wherein U is a natural number greater than 0; and/or
determine, according to the position information, positions corresponding to U idle storage sites whose distances from the robot are within a second preset range as return positions of the second target; wherein U is a natural number greater than 0.

* * * * *